(12) United States Patent  
Gosalia et al.

(10) Patent No.: US 7,528,838 B2  
(45) Date of Patent: *May 5, 2009

(54) VIDEO MEMORY MANAGEMENT

(75) Inventors: Anuj Gosalia, Redmond, WA (US); Steve Pronovost, Redmond, WA (US); Bryan Langley, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 489 days.

This patent is subject to a terminal disclaimer.

(21) Appl. No.: 11/089,856

(22) Filed: Mar. 25, 2005

(65) Prior Publication Data

US 2005/0168472 A1    Aug. 4, 2005

Related U.S. Application Data

(63) Continuation of application No. 10/748,362, filed on Dec. 30, 2003, now Pat. No. 6,947,051.

(60) Provisional application No. 60/448,399, filed on Feb. 18, 2003.

(51) Int. Cl.
    G06F 13/00    (2006.01)
    G06F 12/02    (2006.01)
    G06F 12/06    (2006.01)

(52) U.S. Cl. .................. 345/538; 345/537; 345/543; 345/572

(58) Field of Classification Search .......... 345/564–566, 345/568, 572, 542
    See application file for complete search history.

(56) References Cited

U.S. PATENT DOCUMENTS

| 5,220,653 | A | 6/1993 | Miro | 718/107 |
|---|---|---|---|---|
| 5,247,674 | A | 9/1993 | Kogure | 711/170 |
| 5,696,927 | A | 12/1997 | MacDonald et al. | 711/207 |
| 5,742,797 | A | 4/1998 | Celi, Jr. et al. | 345/548 |
| 5,777,629 | A | 7/1998 | Baldwin | 345/506 |
| 5,864,713 | A | 1/1999 | Terry | 710/52 |
| 5,896,141 | A | 4/1999 | Blaho et al. | 345/541 |
| 5,918,050 | A | 6/1999 | Rosenthal et al. | 718/108 |
| 5,930,827 | A | 7/1999 | Sturges | 711/170 |
| 6,023,738 | A | 2/2000 | Priem et al. | 710/23 |

(Continued)

FOREIGN PATENT DOCUMENTS

WO    WO 02/09083    1/2002

OTHER PUBLICATIONS

Kane, J. et al., "18 Graphics Cards Quick on the Draw", *BYTE/NSTL Lab Report*, Feb. 1996, 142-151.

(Continued)

*Primary Examiner*—Hau H Nguyen  
(74) *Attorney, Agent, or Firm*—Woodcock Washburn LLP

(57) ABSTRACT

A video memory manager manages and virtualizes memory so that an application or multiple applications can utilize both system memory and local video memory in processing graphics. The video memory manager allocates memory in either the system memory or the local video memory as appropriate. The video memory manager may also manage the system memory accessible to the graphics processing unit via an aperture of the graphics processing unit. The video memory manager may evict memory from the local video memory as appropriate, thereby freeing a portion of local video memory use by other applications. In this manner, a graphics processing unit and its local video memory may be more readily shared by multiple applications.

24 Claims, 15 Drawing Sheets

U.S. PATENT DOCUMENTS

| | | | |
|---|---|---|---|
| 6,049,857 A | 4/2000 | Watkins | 711/207 |
| 6,065,071 A | 5/2000 | Priem et al. | 710/22 |
| 6,069,638 A | 5/2000 | Porterfield | 345/568 |
| 6,081,854 A | 6/2000 | Priem et al. | 710/37 |
| 6,222,564 B1 | 4/2001 | Struges | 345/521 |
| 6,252,600 B1 | 6/2001 | Kohli et al. | 345/219 |
| 6,437,788 B1 | 8/2002 | Milot et al. | 345/552 |
| 6,446,186 B1 | 9/2002 | Priem et al. | 711/206 |
| 6,477,612 B1 | 11/2002 | Wang | 711/2 |
| 6,496,912 B1 | 12/2002 | Fields, Jr. et al. | 711/170 |
| 6,518,973 B1 | 2/2003 | Blythe | 345/564 |
| 6,525,739 B1 | 2/2003 | Gurumoorthy et al. | 345/566 |
| 6,600,493 B1 | 7/2003 | Sethi et al. | 345/543 |
| 6,650,333 B1 | 11/2003 | Baldwin | 345/552 |
| 6,691,180 B2 | 2/2004 | Priem et al. | 710/23 |
| 6,704,871 B1 | 3/2004 | Kaplan et al. | 713/192 |
| 6,708,273 B1 | 3/2004 | Ober et al. | 713/189 |
| 6,798,421 B2 | 9/2004 | Baldwin | 345/557 |
| 6,859,208 B1 * | 2/2005 | White | 345/542 |
| 6,947,051 B2 | 9/2005 | Gosalia et al. | 345/543 |
| 7,234,144 B2 | 6/2007 | Wilt et al. | 718/104 |
| 2002/0118202 A1 | 8/2002 | Baldwin | 345/530 |
| 2003/0140179 A1 | 7/2003 | Wilt et al. | 709/321 |
| 2004/0187122 A1 | 9/2004 | Gosalia et al. | 718/102 |
| 2004/0187135 A1 | 9/2004 | Pronovost | 718/100 |
| 2004/0231000 A1 | 11/2004 | Gosalia et al. | 345/568 |

OTHER PUBLICATIONS

Musiari, F., "µPD7220 Graphic Display Controller I° Parte", *Elettronica OGGI*, 1982, 105-111.

Wong, W., "Optimizing Graphics Performance for Portable Computers", *Wescon Conference Record*, Anaheim Convention Center, Nov. 17-19, 1992, 121-123.

Intel Corp, "Accelerated Graphics Port Interface Specification, Revision 1.0," Jul. 1996, 1-161.

Martin, K.E. et al., "Direct Rendering Infrastructure, Low-Level Design Document," http://dri.sourceforge.net/doc/design_low_level.html, May 1999, 1-18.

Owen, J. et al., "A Multiple Direct Rendering Architecture for 3D," http://dri.sourceforge.net/doc/design_high_level.html, Sep. 1998, 1-10.

Torvalds, L. et al., "Excerpt from the Linux Kernel, version 2.4.20," http://www.kernel.org/pub/linux/kernel/v2.4/linux-2.4.20.tar.bz2, Nov. 2002, 1-87.

Burgess, P. et al., "BED: a multithreaded kernel for embedded systems," *Proceedings of the IFAC Workshop on Real Time Programming*, Jun. 22-24, 1994, 133-138.

Macedonia, M., "The GPU enters computing's mainstream," *Computer*, 2003, 36(10), 106-108.

Pétrot, F. et al., "Lightweight Implementation of the POSIX Threads API for an On-Chip MIPS Multiprocessor with VCI Interconnect," *Proceedings Design, Automation and Test in Europe Conference and Exhibition*, Mar. 3-7, 2003, *Suppl.*, 51-56.

Kirk, D.B., "SMART (Strategic memory allocation for real time) cache design," IEEE, 1989, 229-237.

Francesc et al., "Memto: a memory monitoring tool for a linux cluster," Springer Berlin/heidelberg, 2001, 225-232.

* cited by examiner

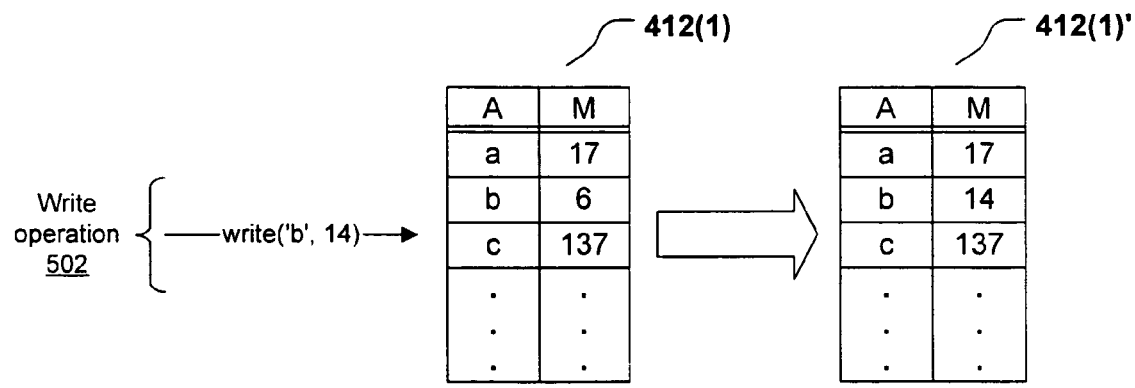
FIG. 4
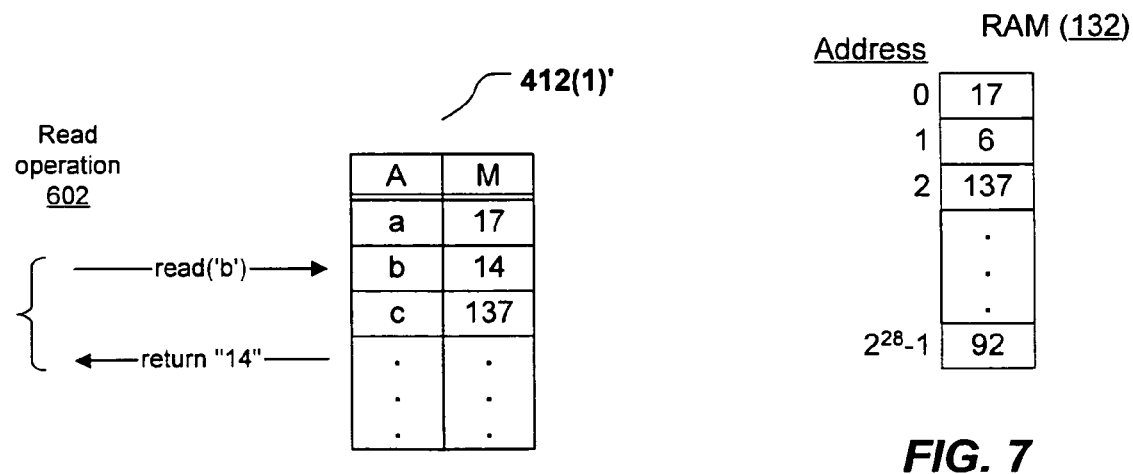
FIG. 5
FIG. 6
FIG. 7

VIDEO MEMORY MANAGEMENT

CROSS-REFERENCE TO RELATED APPLICATIONS

This application claims priority of U.S. patent application Ser. No. 10/748,362 entitled "Video Memory Management," filed Dec. 30, 2003, incorporated by reference herein in its entirety.

This application claims priority of U.S. Provisional Application Ser. No. 60/448,399 entitled "Video Memory Manager Architecture," filed Feb. 18, 2003.

FIELD OF THE INVENTION

The invention relates generally to the field of computing, and, more particularly, to a technique for performing video memory management and virtualizing video memory.

BACKGROUND OF THE INVENTION

The use of graphics in computers has increased dramatically over the years due to the development of graphics based user-friendly application programs and operating systems. To support the computing requirements associated with graphics, computer component manufacturers have developed specialized graphics processing units (GPUs) to offload some of the intense graphics computing demands from the central processing unit (CPU) to these specialized GPUs. Many of these GPUs are implemented on a Peripheral Component Interconnect (PCI) compatible card and include local graphics memory (also referred to herein as video memory) on the card itself. This local video memory enables the GPU to process graphics more quickly.

Current operating systems typically grant GPU resources (e.g., video memory) on a first come-first served basis. If one application has been allocated all of the GPU resources (e.g., the entire local memory of the GPU), then other applications may not be able to run or they may run with errors. As the use of GPUs may become more prevalent, there is a need for techniques for more fairly allocating GPU resources among applications.

SUMMARY OF THE INVENTION

A video memory manager manages and virtualizes memory so that an application or multiple applications can utilize both system memory and local video memory for processing graphics with a graphics processing unit. The video memory manager allocates memory in either the system memory or the local video memory as appropriate. The video memory manager may also manage system memory accessible to the graphics processing unit via an aperture of the graphics processing unit. The video memory manager may also evict memory from the local video memory as appropriate, thereby freeing a portion of local video memory use by other applications. In this manner, a graphics processing unit and its local video memory may be shared by multiple applications.

The video memory manager may distinguish between various types of graphics data and treat them differently. For example, resources may be distinguished from surfaces. Resources may be stored in a kernel mode of the operating system. Surfaces may be stored in a user mode process space of the operating system. Surfaces may be classified as either static or dynamic, depending on whether the central processing unit has direct access to the surface.

The video memory manager may use a fencing mechanism, for example, a monotonic counter, to determine information about the status of the graphics processing unit. The graphics processor may increment the counter for each command buffer processed. The video memory manager may determine whether a surface has been used or is about to be used by reading the counter.

Memory allocation may be divided into big and small memory allocations and treated differently. Big memory allocations may use entire dedicated pages. Small memory allocations may share a single page to conserve memory.

Other features are described below.

BRIEF DESCRIPTION OF THE DRAWINGS

The foregoing summary, as well as the following detailed description of illustrative embodiments, is better understood when read in conjunction with the appended drawings. For the purpose of illustration, there is shown in the drawings illustrative embodiments of invention; however, the invention is not limited to the specific embodiments described. In the drawings:

FIG. 4 is a block diagram of an illustrative addressable entity which may be addressed by a video memory manager in accordance with an embodiment of the invention;

FIG. 5 is a block diagram of a write request on an addressable entity, showing the resulting mapping modification;

FIG. 6 is a block diagram of a read request on the modified mapping produced by the read request of FIG. 5;

FIG. 7 is a block diagram of a random access memory;

DETAILED DESCRIPTION OF ILLUSTRATIVE EMBODIMENTS

Computer System

Figure 1:
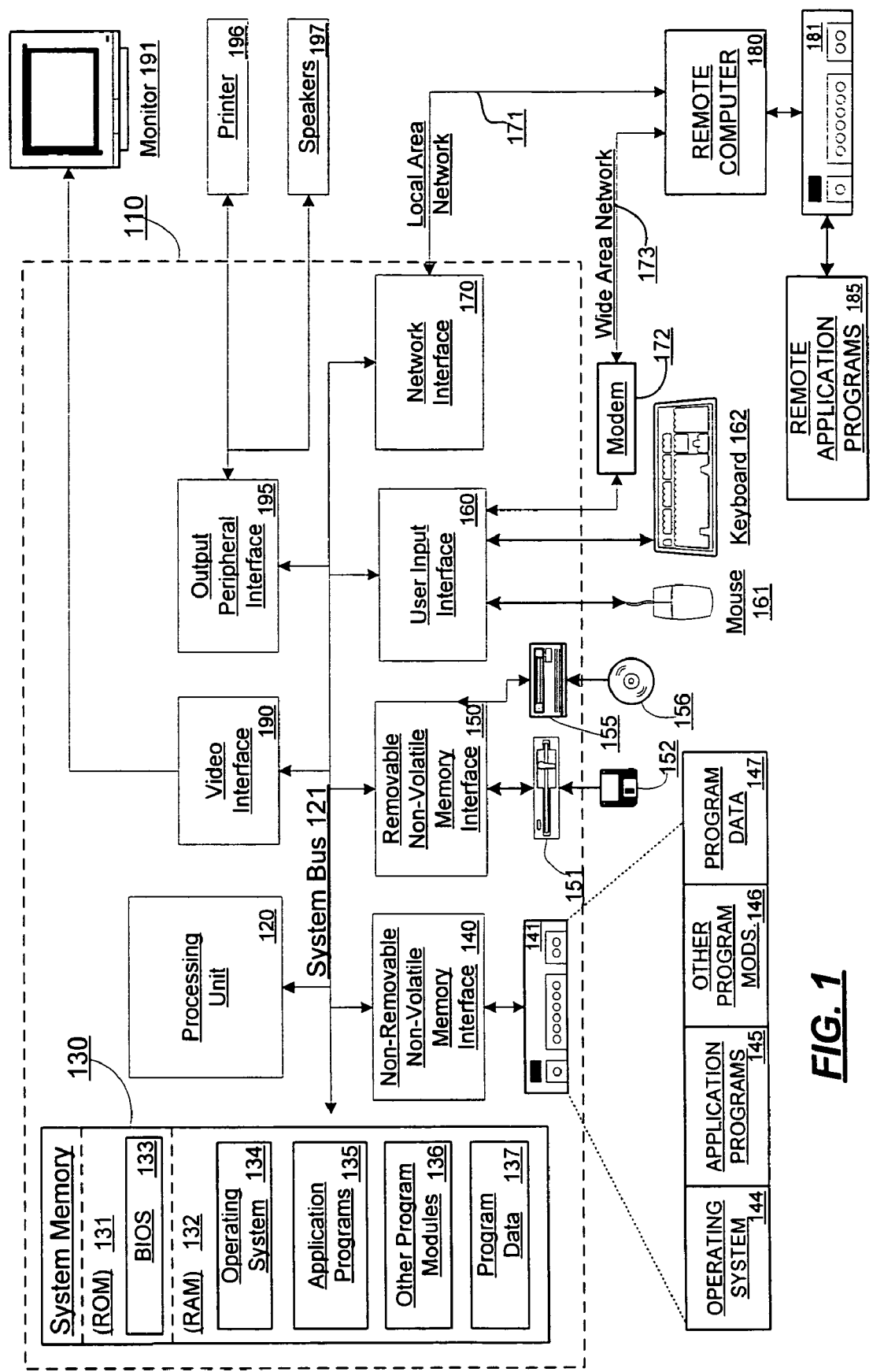
FIG. 1 is a block diagram of an illustrative computing environment in which aspects of the invention may be implemented.

FIG. 1 shows an illustrative computing environment 100 in which aspects of the invention may be implemented. Computing environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the illustrative environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an illustrative system for implementing the invention includes a general purpose computing device in the form of a computer 110. Components of computer 110 may include, but are not limited to a processing unit 120 (e.g., central processing unit CPU 120), a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus. Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137. System memory 130 may be separated into kernel memory (which is a memory protected by the operating system 134) and application or process memory (which is a memory used by application programs 135 and is subject to less protection than kernel memory).

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the illustrative operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are illustrative and other means of establishing a communications link between the computers may be used.

Figure 2:
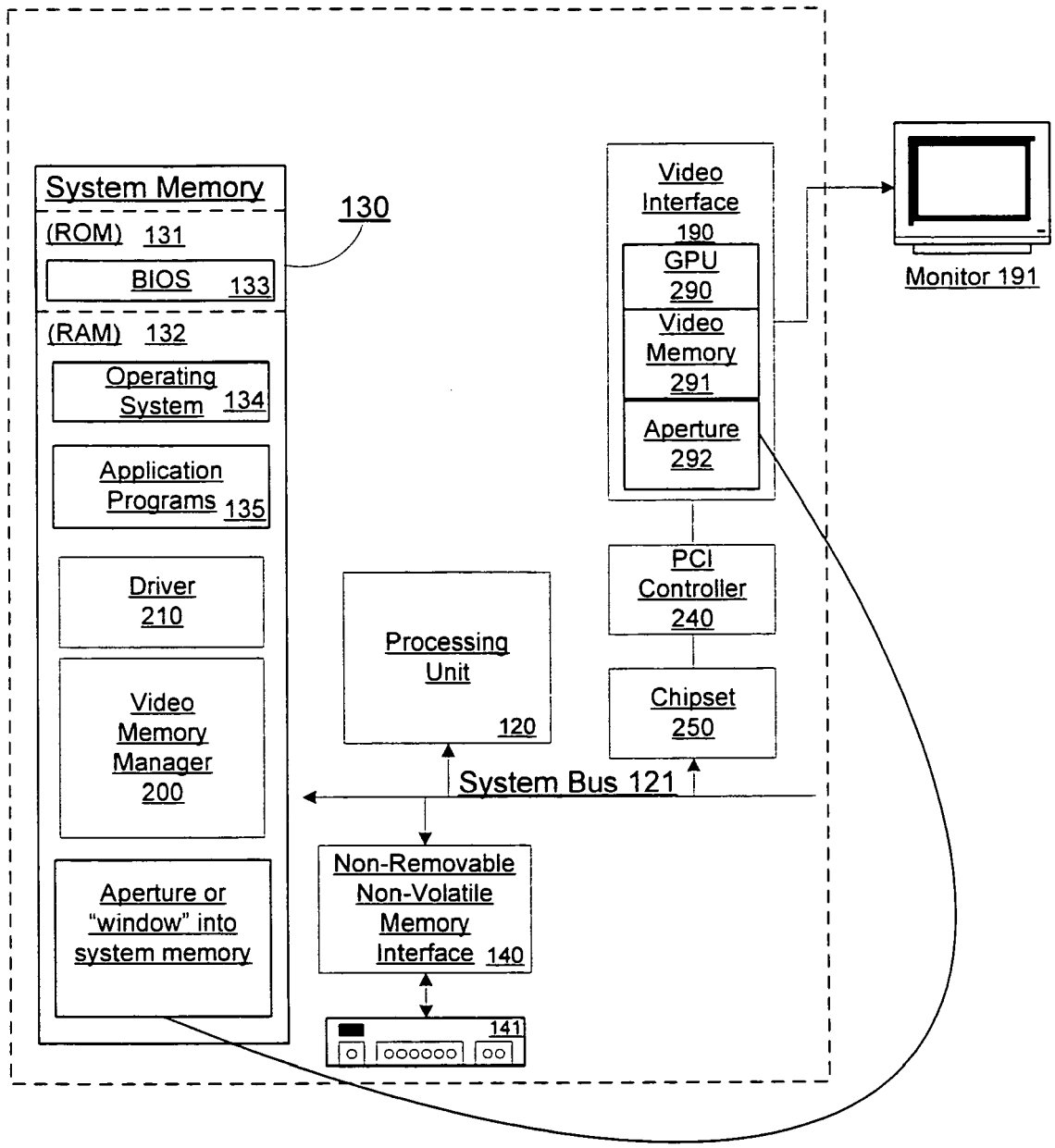
FIG. 2 is a block diagram showing more illustrative details of the computing environment of FIG. 1 in which aspects of the invention may be implemented.

FIG. 2 shows more details of the illustrative computing environment 100 of FIG. 1. As shown in FIG. 2, video interface 190 includes a graphics processing unit (GPU) 290. GPU 290 typically includes a specialized processor for processing graphics. GPU 290 typically includes a graphics pipeline for high-speed processing of graphics information. Inclusion of GPU 290 in computer 110 may allow offloading of the intense graphics computational demands from CPU 120. As shown, GPU 290 includes video memory 291. Video memory 291 may store graphics data and information useful for generating graphics for display on monitor 191.

Video interface 190 communicates with other devices in computing environment 100 via Peripheral Component Interconnect (PCI) controller 240 and chipset 250. GPU 290 may include an aperture 292 that functions as a high-speed "window" into system memory 130. That is, aperture 292 of GPU 290 maps to corresponding system memory 130 and allows GPU 290 to view system memory 130 via a virtual memory addressing scheme. This allows GPU 290's view of a memory allocation to appear contiguous, even though the memory allocation may actually be located in discontiguous physical system memory pages.

Video memory manager 200 may provide address translation for GPU 290, thereby virtualizing memory for GPU 290. Video memory manager 200 may include an address translation mechanism to convert between virtual addresses and physical memory addresses. In this manner, GPU 290 may be more easily shared between multiple applications at the same time. Video memory manager 200 (also referred to herein as VidMm) may reside in a kernel mode component of operating system 134.

Application program 135 may access various components of computing environment 100 via driver 210. Driver 210 may be implemented as two separate drivers, such as, for example, a user mode driver and a kernel mode driver. The user mode driver (which is typically provided by a GPU supplier) is typically loaded in the private address space of application 135. The user mode driver may request the creation and destruction of memory allocation and generate their references. However, the user mode driver is typically not involved in the actual management of allocations (e.g., the allocation of actual underlying resources, paging, eviction, and the like). The kernel mode driver (which is typically provided by a GPU supplier) is typically loaded in kernel space of operating system 134. The kernel mode driver may interact with video memory manager 200 in the management of allocations. For example, when video memory manager 200 desires to evict an allocation from video memory to system memory, video memory manager 200 may call the kernel mode driver, which in turn requests GPU 290 to perform some function associated with eviction.

Such virtualization is made possible because GPU 290 only needs a subset of the allocated memory to be present in local video memory 291 or non-local video aperture 292 at any given time. For example when drawing a triangle for an application, GPU 290 only uses the texture for that triangle, not the entire set of texture used by the application. Thus video memory manager 200 may attempt to keep the correct subset of graphics content visible to GPU 290 and move unused graphics content to an alternative medium (e.g., system memory 130).

Video memory manager 200 may arbitrate the resources among the applications by tracking the allocations made on behalf of every process and balancing resource usage among the processes. Video memory manager 200 may implement the virtualization of memory through the use of a video memory manager 200 created handle. Clients (e.g., application 135) of video memory manager 200 may reference addresses and allocations through the use of the handle. In this manner, a client may not actually know the physical address of the graphics data. Video memory manager 200 may convert a given handle to a GPU visible address.

Figure 3:
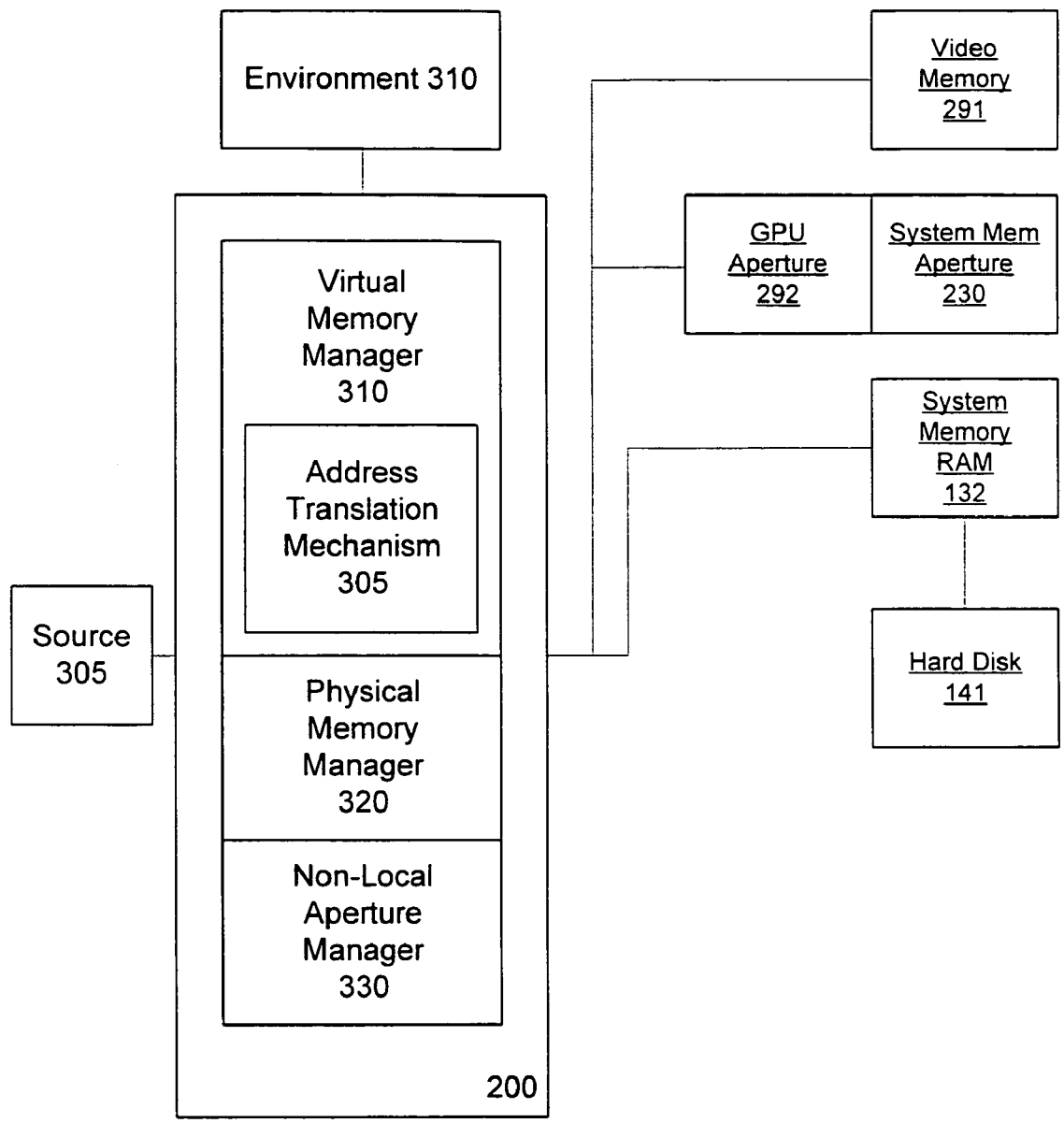
FIG. 3 is a block diagram of a video memory manager in accordance with an embodiment of the invention.

FIG. 3 shows more details of an illustrative video memory manager 200. As shown in FIG. 3, video memory manager 200 includes virtual memory manager 310, a physical memory manager 320, and a non-local aperture manager 330. Virtual memory manger 310 includes an address translation mechanism 305 for virtualizing memory. Video memory manager 200 may also determine information about the state of computing environment 100, indicated by environment information 310, in order to make certain decisions about where to store memory, how to map to memory, and the like. It should be noted that while the term "environment" may suggest that it contains information about the general conditions present at the time some mapping is computed, it is not limited to such information but rather may include any arbitrary type of information. For example, the environment information 310 may include the context of the operating system (which application is currently executing), and the like.

Video Memory Manager and Address Translation

Virtual memory manager 310 includes an address translation mechanism 305 which performs address mapping between a source 305 (e.g., application 135, GPU 290, and the like) that requests data and a data storage device containing the requested data (e.g., video memory 291). The requested data may be stored in video memory 291, system memory RAM 132, system memory 132 and may be accessible via GPU aperture 292, hard disk 141, and other addressable entities.

Address translation mechanism 305 may perform various address mapping functions between sources and addressable entities (e.g., memory, etc.). FIG. 4 depicts a simple addressable entity 412(1), where each row of the table has a member of A on the left, and a member of M on the right. Thus, in the example of FIG. 4, if f is the function defined by addressable entity 412(1), then f('a')=17, f('b')=6, f('c')=3, and so on.

With reference to FIGS. 5 and 6, a write operation 502 ("write('b',14)") on the simple addressable entity 412(1) changes the mapping to 412(1)', by changing the value "6" to "14" on the line whose set "A" value is 'b'. If read operation 602 ("read('b')") is subsequently performed on mapping 412 (1)', this read operation will return the value "14," since write operation 502 has changed the original mapping 412(1) such that the set A element 'b' now maps to the set M element "14". As noted above, the semantics that allow a read operation following a write operation to return the value that was written are illustrative, but not definitive, of an addressable entity. As discussed below, there are examples of addressable entities whose read and write operations have different semantics.

Addressable entities include physical random access memory (e.g. RAM 132, shown in FIG. 1). FIG. 7 shows an example of RAM 132 as an addressable entity, RAM 132, in this example, comprises $2^{28}$ bytes, each having a physical address in the range 0 to $2^{28}-1$. In this example, the value 17 is stored at address 0, 6 is stored at address 1, 137 is stored at address 2, and so on. Addressable entities also include control registers, CPU registers, and the like.

Figure 8:
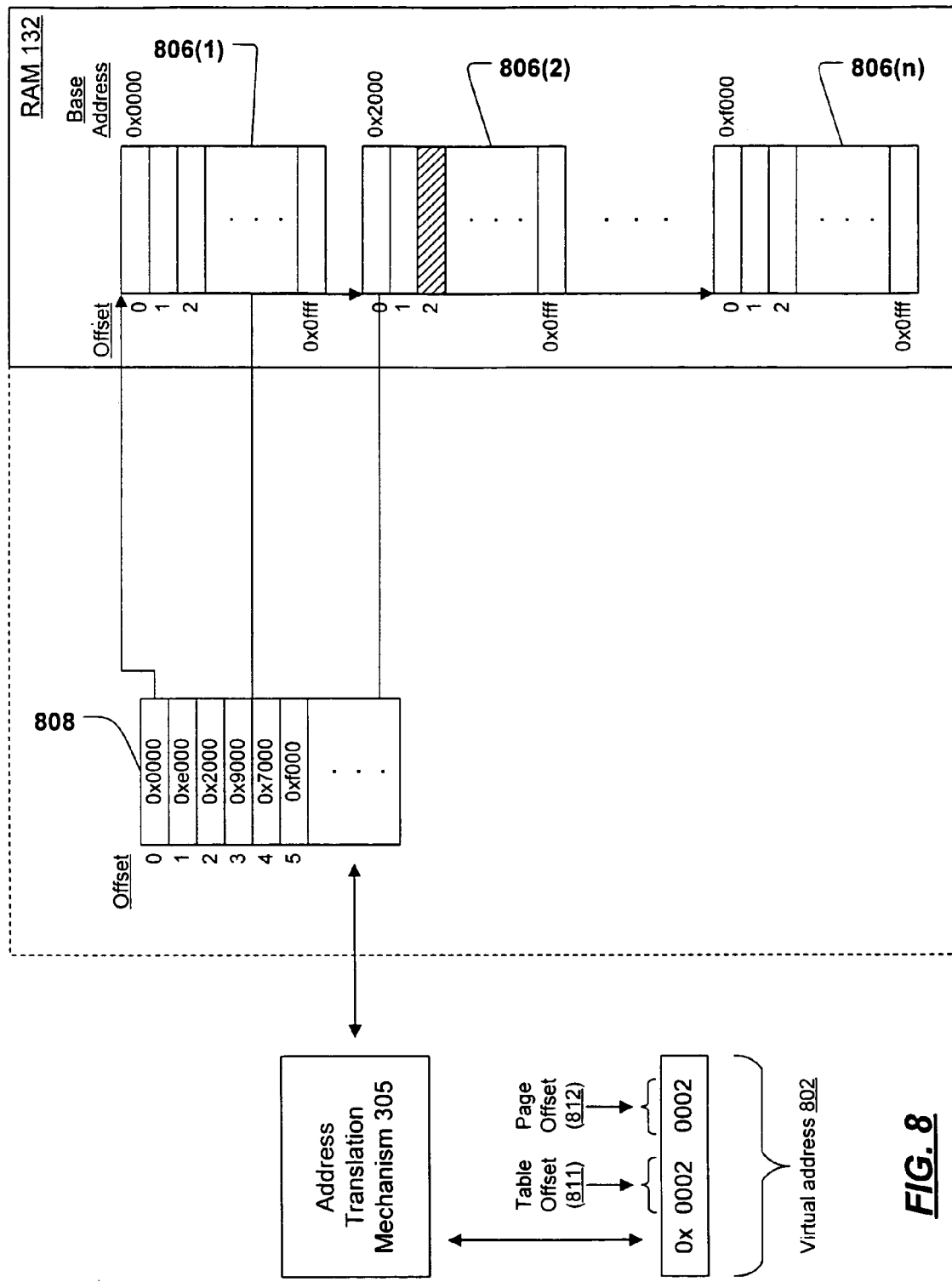
FIG. 8 is a block diagram of an illustrative paging scheme for video memory management in accordance with an embodiment of the invention.
Figure 9:
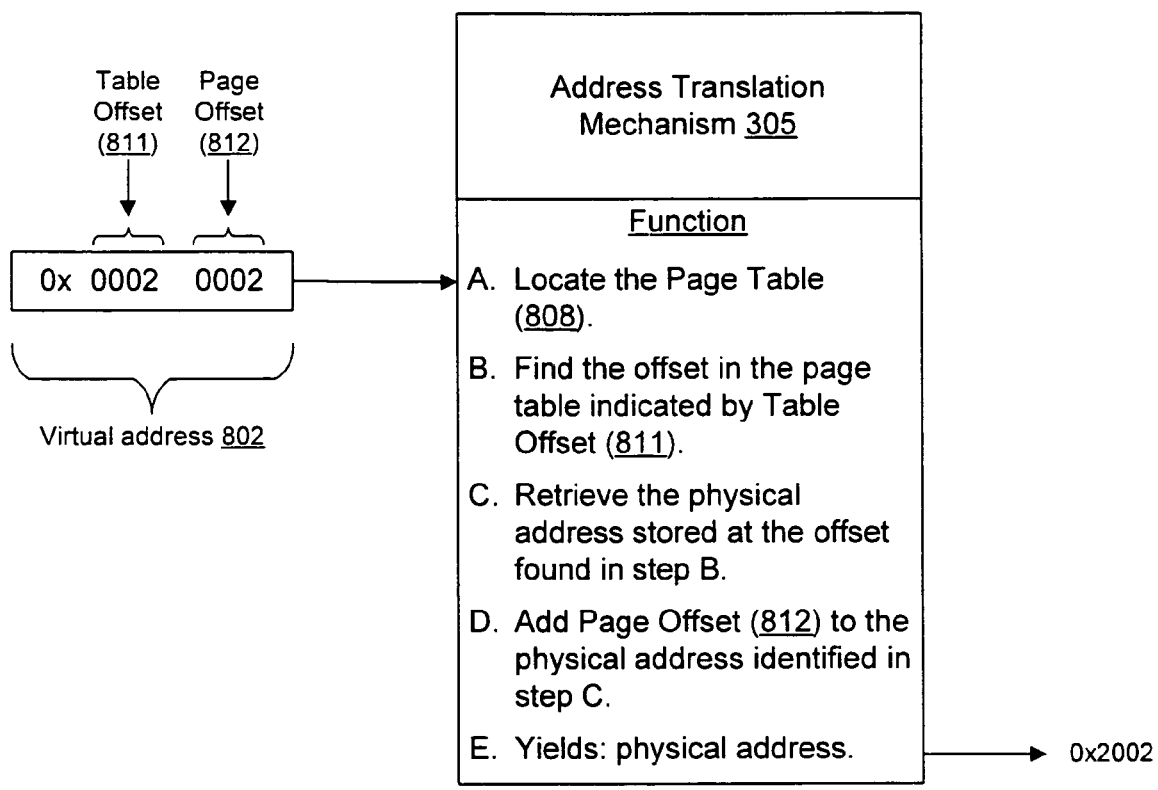
FIG. 9 is a block diagram of another illustrative address translation mechanism for video memory management, which is adapted for use with the illustrative paging scheme of FIG. 8.
Figure 10:
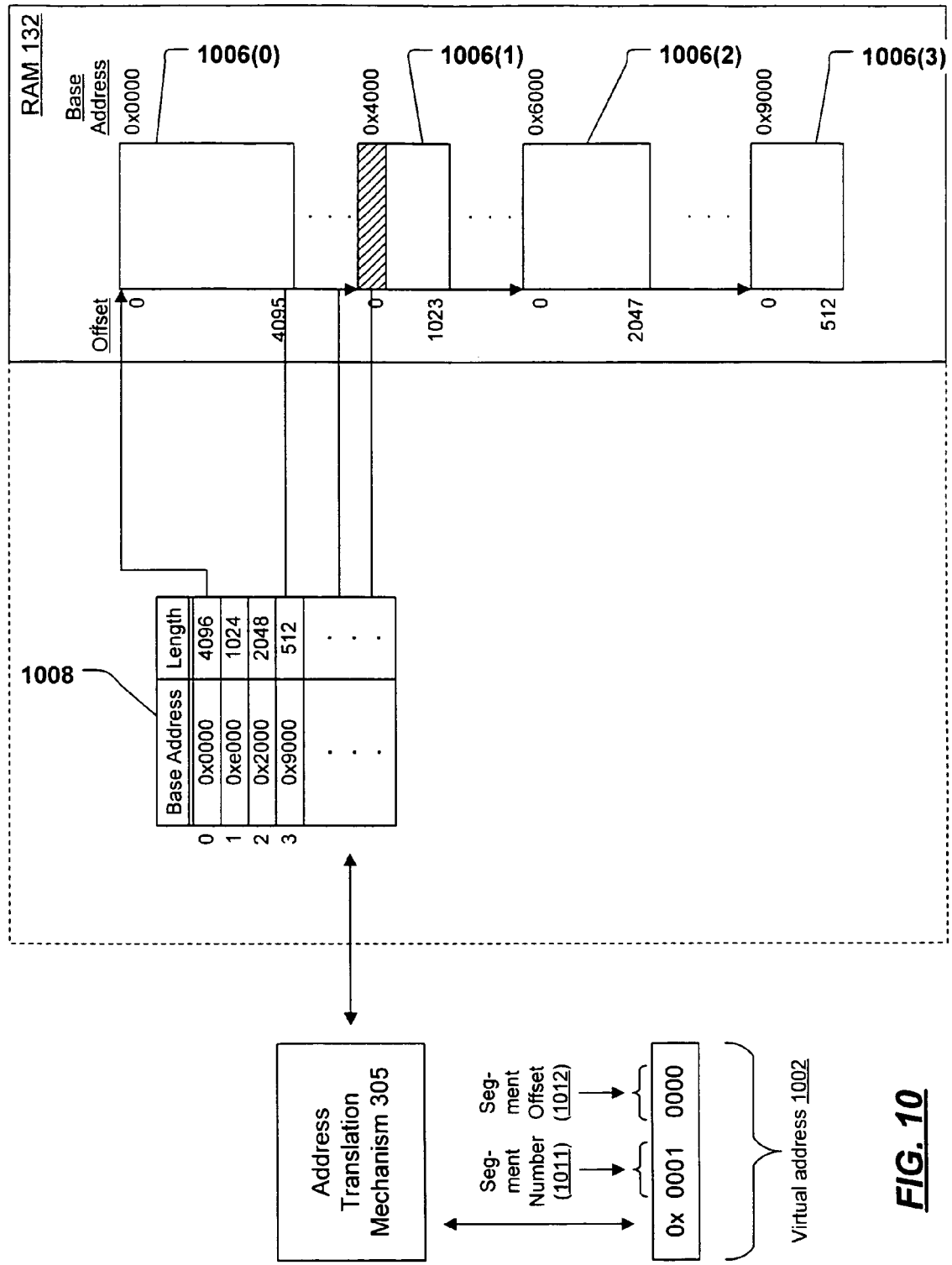
FIG. 10 is a block diagram of an illustrative segmentation scheme for video memory management in accordance with an embodiment of the invention.

Address translation mechanism 305 may be based on paging and segmentation schemes. FIGS. 8-10 depict examples of such schemes. It should be understood that pages and segments are a way of grouping addressable entities and into "buckets" so they can be dealt with conveniently in large units.

FIG. 8 depicts an example of a paging scheme. In FIG. 8, fixed-sized portions of RAM 132 are designated as pages 806(1), 806(2), . . . 806(n). In the example of FIG. 8, each page is four kilobytes (4096 bytes) in length, although paging schemes are not limited to any particular page size (and some paging schemes support pages that have more than one size—e.g., where a page can be either four kilobytes or four megabytes in length). Each page has a base address in RAM 132. The base addresses of pages 806(1), 806(2), and 806(n) are 0x0000, 0x2000, and 0xf000, respectively. (As will be recognized by those of skill in the art, the prefix "0x," by convention, indicates that a value is in hexadecimal, or base 16.) Within each page, each byte can be described by an offset relative to the page's base address. Thus, within each page the first byte has offset 0, the second byte has offset 1, and so on.

Since each page in the example of FIG. 8 is 4096 bytes in length, the last byte of each page has offset 4095 (or 0x0fff).

Page table 808 is a list of pointers to the various pages 806(1) through 806(n). Each entry in page table 808 may also contain one or more "attributes" as described above—i.e., a marker that indicates whether the page pointed to by the pointer is read/write or read-only, or another marker that indicates whether the page is "present" in RAM 132 or "not present." (A page might be marked as not present if, say, it had been swapped to disk to make room in RAM 132 for other data.) Each element of page table 808 contains the base address of a page in the page table. Moreover, each element can be identified by an offset into the page table. Thus, the element of page table 808 stored at offset 0 is 0x0000, which is the base address of page 806(1); the element stored at offset 2 is 0x2000, which is the base address of page 806(2): and the element stored at offset 5 is 0xf000, which the base address of offset 806(n). Other offsets into page table 808 point to different pages that are not depicted in FIG. 8. It should be noted that page table 808 is typically stored in RAM 132, and shown by the dashed line encompassing page table 808.

Address translation mechanism 305 may use page table 808 to convert a virtual address 802 into a physical address. Address translation mechanism 305 may include hardware and software that performs various functions, including the translation of virtual addresses into physical addresses. In the example of FIG. 8, virtual address 802 comprises two parts: a table offset 811 and a page offset 812. Address translation mechanism 305 identifies a particular physical address in RAM 132 based on virtual address 802. In order to identify a physical address, address translation mechanism 305 first reads table offset 811, and uses this value as an index into page table 808. Next, address translation mechanism 305 retrieves whatever address appear in the page table 808 entry defined by table offset 811, and adds page offset 812 to this value. The resulting value is the address of a particular byte in one of the pages 806(1) through 806(n). In the example of FIG. 8, table offset 811 is 0x0002. Thus, address translation mechanism 305 locates the base address stored at offset 2 from the beginning of page table 808. In this case, that base address is 0x2000. Address translation mechanism 305 then adds page offset 812 to the value located in the page table. Page offset 812, in this example, is also 0x0002, so address translation mechanism 305 adds 0x2000+0x0002=0x2002, which is the physical address of the byte in page 806(2) that is indicated by slanted lines.

Address translation mechanism 305 may also be configured to perform some action based on the attribute(s) contained in the page table. For example, if the access request is to write to a byte of memory, and the page table entry for the page in which that byte is located indicates that the page is read-only, then address translation mechanism 305 may abort the request and/or invoke some type of fault handler. Similarly, if the byte is on a page marked as "not present," then video memory manager 200 (or the memory manager of the operating system) may take steps to copy the image of the page back into RAM 132 from wherever that image is stored (e.g., disk), and/or may invoke some type of fault handler.

FIG. 9 shows another illustrative address translation mechanism 305. Address translation mechanism 305 implements a function that: (A) locates page table 808; (B) finds the offset in the page table indicated by table offset 811; (C) retrieves the physical address stored at the offset found in (B); (D) adds page offset 812 to the physical address retrieved in (C); and (E) produces the result computed in (D). The function implemented by address translation mechanism 305 may also take certain action (e.g., aborting access requests, generating faults or exceptions, swapping pages into memory) depending on the state of the attributes, as described above.

FIG. 10 depicts an illustrative segmentation scheme. In this example, sections of RAM 132 called "segments" are delimited. FIG. 10 shows four illustrative segments, 1006(0), 1006(1), 1006(2), and 1006(3). Each segment has a base address and a length. Segments may have different lengths. Segment table 1008 lists the base addresses and lengths of segments 1006(0) through 1006(3). Thus, segment 1006(0) begins at base address 0x0000 and has length 4096. segment 1006(1) begins at base address 0x4000 and has length 1024, and so on. Segment table 1008 is typically stored in RAM 132, as indicated by the dashed lines. Segment table 1008 may also list, for each segment, information such as read-only/read-write, present/not-present, etc., as described above.

Address translation mechanism 305 converts a virtual address 1002 into a physical address using segment table 1008. Virtual address 1002 comprises a segment number 1011 and a segment offset 1012. Thus, in the example of FIG. 10, address translation mechanism 305 uses segment number 1011 as an offset into segment table 1008. In this example, segment number 1011 is "1", so address translation mechanism 305 looks at offset 1 into segment table 1008, and locates the address 0x4000. Address translation mechanism 305 then adds segment offset 1012 (in this case 0x0000) to this address to create a physical address. Thus, 0x4000+0x0000=0x4000. Thus, address translation mechanism 305 identifies the byte in segment 1006(1) indicated by slanted lines.

Moreover, the virtual address may include a field or bits to indicate which storage medium contains the physical memory. For example, a first field (of two bits) may have the value of one if the physical memory is in video memory 291, may have the value of two if the physical memory is in system memory 130 and not visible through non-local aperture 292, and may have the value of three is the physical memory is in system memory 130 visible through non-local aperture 292.

As seen, address translation allows video data to be stored in various data storage devices and allows virtualization of video memory (e.g., video memory 291, non-local aperture 292, system memory 130). Video memory manager 200 may also perform memory management (including memory allocation/deallocation) to support the virtualization of memory. A video memory allocation is a collection of bits that holds some content for a surface. Before discussing memory management in detail, we describe various types of graphics data and resources for processing graphics.

Surfaces

A surface represents a logical collection of bits allocated on behalf of an application. The content of a surface (i.e., the logical collection of bits) is typically under the control of the application. A surface may be constructed out of one or more video memory allocations. These video memory allocations may or may not be directly visible to the application even though the application can ultimately control the content. An example of a surface having more than one video memory allocation is a palletized texture on hardware that doesn't support such a type of texture. The driver could use one video memory allocation to hold the content of the texture in palletized mode, and use a second video memory allocation to hold the content of the texture in expanded mode. Surfaces may be dynamic or static—the difference is how the application accesses the content of that surface.

A static surface is a surface for which the application doesn't have direct CPU access to the bits of the surface, even though it can control the content indirectly. An application may understand the logical format of the surface and control the content, for example, through a GPU operation. 'Static' means that the content of the surface should only change if those surfaces are the target of a GPU 290 operation. Static surfaces may be used to allocate textures, vertex buffers, render targets, z-buffers, and the like. A static surface may include multiple static video memory allocations, described in more detail below.

Dynamic surfaces are similar to static surfaces, except that an application can request to have direct CPU access to the bits of the surface. Dynamic surfaces allow the application to access the content of the surface through GPU operation and through direct CPU access. A dynamic surface includes at least one dynamic video memory allocation and can include static video memory allocations, described in more detail below.

Resources

A resource is a memory allocation (e.g., video memory) that driver 210 may use to support one or more applications but for which no application controls or should be allow to control the content directly. For example, when an application uses a vertex shader, the driver compiles the shader into a GPU specific binary that is executed by the GPU. While the application controls the content of that buffer indirectly by specifying the vertex shader to use, the application doesn't control the exact binary that get produced. For security reasons, the content of those allocations are not typically made directly available to the application. A resource typically includes a single physical video memory allocation. Resources include application resources and driver resources.

An application resource is a resource used by driver 210 to support a particular application but the resource can't be directly accessed by the application. If the resource fails, the application doesn't work properly, but other applications continue to work properly. An example is a pixel shader binary compiled for a particular application's pixel shader code, an application GPU page table, and the like.

Driver resources are resources that driver 210 uses to allow the operation of all applications. The difference is that driver resources aren't bound to a particular application. A driver resource may be, for example, the primary swap chain for the desktop.

Video Memory Allocation

As stated above, a video memory allocation is a collection of bits that holds some content for a surface. A static video memory allocation is a video memory allocation that, in general, is not directly accessed by CPU 120. A dynamic video memory allocation is a video memory allocation that may be directly accessed by CPU 120, A dynamic surface, therefore, includes at least one dynamic allocation while a static surface does not include a dynamic allocation.

A physical video memory allocation is an allocated range in a particular physical video memory segment of video memory 291.

A non-local aperture allocation is an allocated range in the physical space controlled by non-local aperture 292. It should be understood that this type of allocation can't by itself hold any graphics data. It's only a physical space allocation and that physical space in non-local aperture 292 is redirected to the system memory 130 (e.g., pages holding the video memory allocation data).

Video Memory Manager

Video memory manager 200 performs various functions during memory management, such as for example, allocation and deallocation of physical memory, allocation and deallocation of virtual memory, protection of memory, eviction of data from one data storage device to another, and the like. Video memory manager 200 may use one or a combination of a virtual memory manager 310, a physical memory manager 320, and a non-local aperture manager 330 to perform various functions related to memory management. While video memory manager 200 is shown as having three memory managers, video memory manager 200 may include any number of memory managers and the functionality may be apportioned between the various memory managers in any convenient fashion.

Physical Memory Manager

Physical memory manager 320 manages physical video memory 291 and a portion of physical system memory 130. Physical memory manager 320 attempts to find an appropriate free range of contiguous physical video memory 291 when a video memory allocation is requested. When physical video memory 291 is full, physical memory manager 320 (in conjunction with virtual memory manager 310) may evict data to system memory 130. Physical memory manager 320 may also determine which allocation to evict when physical video memory 291 is full. The address space of the physical video memory 291 can be divided into one or more segments and each segment may be managed separately as a linear heap, pages, and the like. Driver 210 may decide how each segment should be managed.

The physical address space of GPU 290 may be divided into multiple segments (referred to herein as physical video memory segments) that form the pool of available local video memory 291. Each physical video memory allocation is allocated from one of those segments. Segmenting the physical address space of GPU 290 allows different portions of video memory 291 to be treated differently. For example, only a subset of the address space might be visible through the aperture. Similarly, certain type of surfaces might only be allocated from certain segments, and not others.

Figure 17:
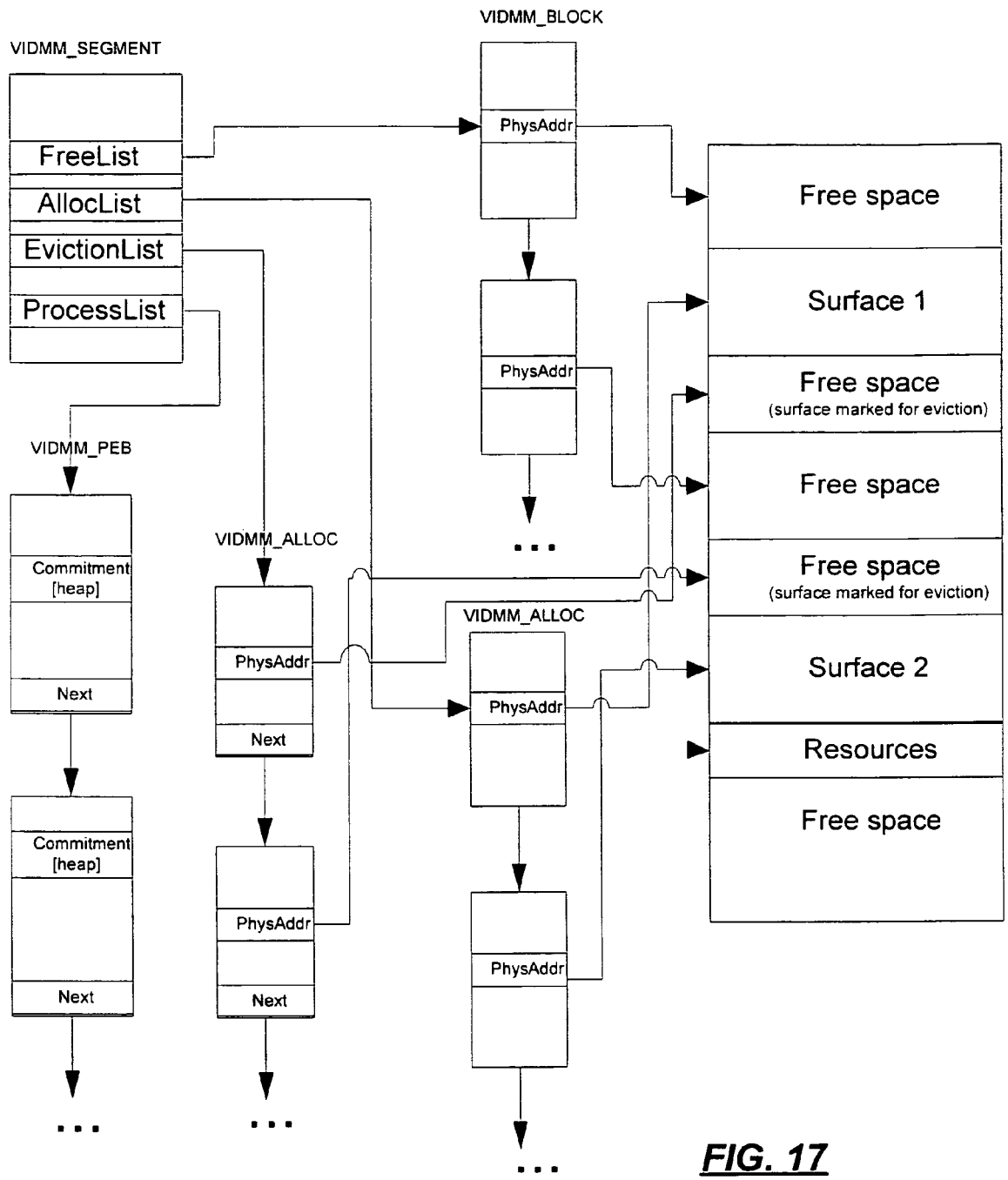
FIG. 17 is a block diagram showing an illustrative heap management of physical memory in accordance with an embodiment of the invention.

In heap management mode, physical memory manager 320 may create a heap the size of the segment and satisfy requests for memory allocations by allocating a linear contiguous range in that heap. Physical memory manager 320 may maintain for each segment a list of surfaces and a list of processes having commitment in the heap, as shown in FIG. 17. The list of allocations may be maintained in a least recently used (LRU) order. Each time driver 210 notifies physical memory manager 320 of the usage of an allocation, physical memory manager 320 puts that allocation at the end of the list for the segment in which it is allocated. Similarly, each time a surface is allocated in the segment, the process it's associated with is updated with information about how much memory it has committed in that segment. These two pieces information may be used to implement an eviction policy.

When the segment is full and something needs to be allocated, physical memory manager 320 may chose as candidate for eviction, as follows. First, check if some surfaces haven't been used for a long time and move those surfaces to the eviction list (and add their memory to the free list). Second, try allocating memory again. If successful, determine which allocation in the eviction list gets to be reused, evict those allocations to system memory 130, and return a new physical address to the caller. Third, trim all processes to the maximum working set. For each process, move all the least recently used allocations to the eviction list until that process's total committed memory is below the maximum working set. Fourth, try allocating memory again. Fifth, trim all processes to the minimum working set. For each process, move all the least recently used allocations to the eviction list until that process's total committed memory is below the maximum working set. Sixth, try allocating memory again. Seventh, scan the list of allocations for that process in LRU order—if a block fits, use it. Eighth, try allocating memory again. Ninth, if the surface shouldn't be aggressively committed, return an error to the caller. Tenth, mark all allocations already committed for that process in the heap for eviction. Eleventh, try allocating memory again. Twelfth, mark all allocations in the heap for every process (from the surface allocator) as ready for eviction. Thirteenth, try memory allocation again.

When marking surfaces for eviction, physical memory manager 320 doesn't have to actually evict the surface at that moment—it can just reclaim the physical memory range (and remember the range in the eviction list). When memory is actually allocated for the new allocation, physical memory manager 320 may check the list to see which surface is currently located in that range. Then, physical memory manager 320 may evict those surfaces from video memory 291 and truly reclaim memory. Surfaces not actually evicted may remain on the eviction list until the next eviction or until driver 210 references a surface, in which case it may be removed from the eviction list and put back at the end of the allocated list. An illustrative API for use by driver 210 to allocate physical memory for an application or a driver resource is given by:

```
NTSTATUS
VidMmAllocateContiguous(
    IN PVOID HwDeviceExtension,
    IN VIDMM_SEGMENT Segment,
    IN SIZE_T Size,
    IN ULONG Alignment,
    OUT PPHYSICAL_ADDRESS PhysAddress);
```

A surface allocator for dynamic and static surfaces may use a slightly different API to allocate physical memory, as shown below.

```
NTSTATUS
VidMmiAllocateContiguous(
    IN PVOID HwDeviceExtension,
    IN VIDMM_SEGMENT Segment,
    IN HANDLE hAlloc,
    IN BOOLEAN Aggressive);
```

Illustrative APIs to free the memory are given by:

```
NTSTATUS
VidMmFreeContiguous(
    IN PVOID HwDeviceExtension,
    IN PPHYSICAL_ADDRESS PhysAddress);
```

```
NTSTATUS
VidMmiFreeContiguous(
    IN PVOID HwDeviceExtension,
    IN HANDLE hAlloc);
```

Non-local Aperture Manager

Figure 18:
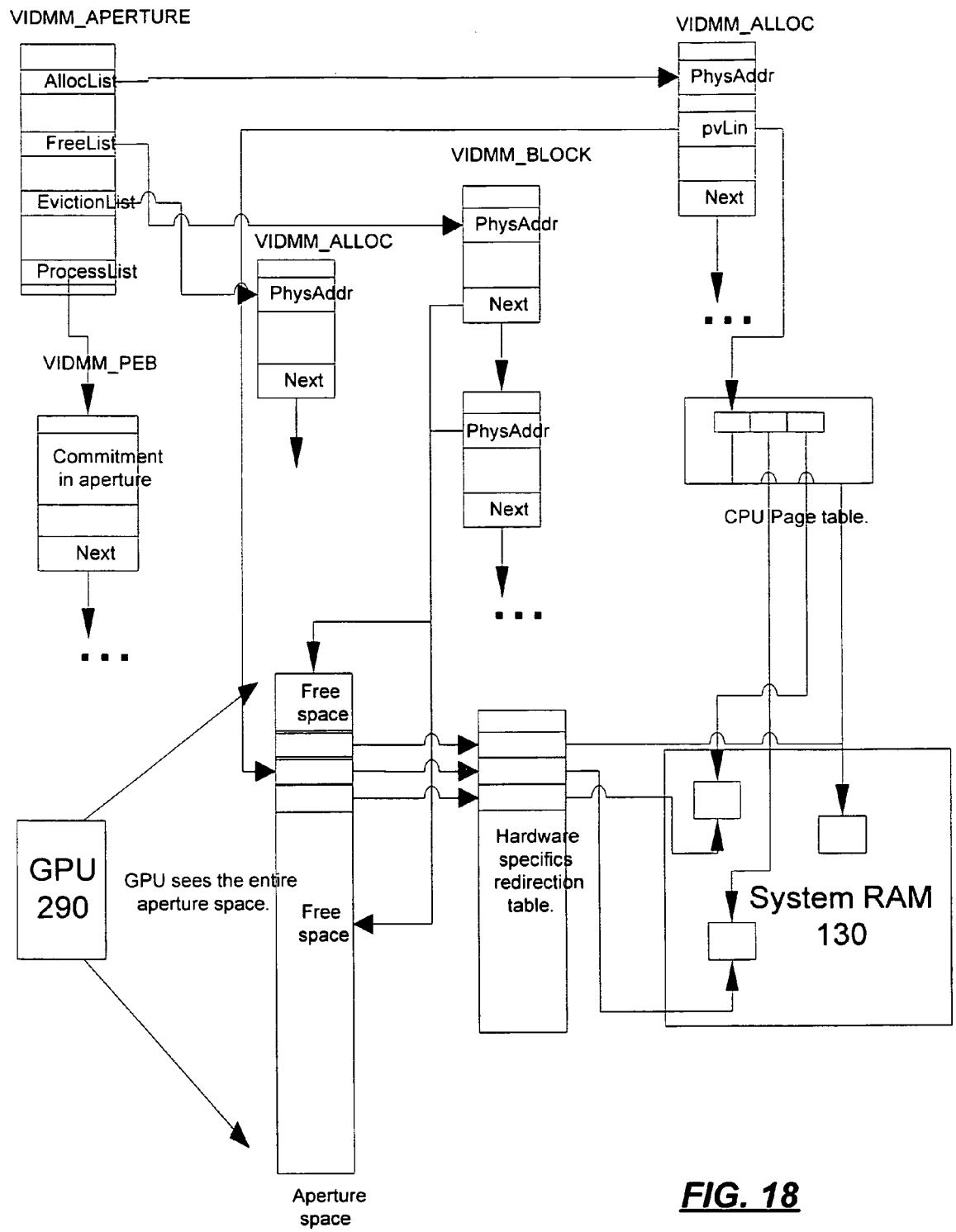
FIG. 18 is a block diagram of an illustrative aperture memory management in accordance with an embodiment of the invention.

Non-local aperture manager 330 manages non-local aperture 292. Non-local aperture manager 330 doesn't actually "allocate" any memory; rather, non-local aperture manager 330 allocates a memory range in aperture 292 itself. Aperture 292 is really an address space and thus non-local aperture manager 330 doesn't really allocate memory but allocates address space to be redirected (mapped) to some actual system physical memory in system memory 130. Non-local aperture manager 330 may manage the space inside the aperture on a page basis. Once a range is allocated, non-local aperture manager 330 can lock a system memory surface into place and map it through the non-local aperture 292. Non-local aperture manager 330 may call a driver responsible for aperture 292 to do the mapping on its behalf. FIG. 18 depicts illustrative management of non-local aperture 292. An illustrative API is given below.

```
NTSTATUS
VidMmNonLocalMap(
    IN PVOID HwDeviceExtension,
    IN PVOID pvLin,
    OUT PPHYSICAL_ADDRESS PhysAddr);
```

```
NTSTATUS
VidMmNonLocalUnMap(
    IN PVOID HwDeviceExtension,
    IN PHYSICAL_ADDRESS PhysAddr);
```

Virtual Memory Manager

Virtual memory manager 310 may perform dynamic and static video memory allocations. Virtual memory manager 310, in effect, creates a hierarchy of data storage for graphics data. Thus, as described above, a video memory allocation may not be resident in physical video memory 291. Instead, the bits of a video memory allocation might be in physical video memory 291, in physical system memory 130 (and may be visible or not visible through aperture 292), or even on hard disk 141 accessible via the page file system of operating system 134.

Resource Allocation and Management

As described above, resources are important to the proper rendering of graphics. As such, video memory manager 200 (in conjunction with virtual memory manager 310) may attempt to protect some memory (e.g., memory associated with a resource) from being corrupted by other applications. Some processors allow physical memory to be accessed directly, so an application program 135 (also referred to herein as a process) could execute an instruction to access a given physical address regardless of whether that address had been assigned to the process's address space.

Video memory manager 200 may protect a video memory allocation by implementing a process specific handle for each process, by allowing direct CPU access only to video memory allocations owned by a specified process, and the like, described in more detail below.

Video memory manager 200 may also protect a video memory allocation in system memory 130 by storing the video memory allocation in kernel memory while other (typically less critical) video memory allocations may be stored in the private process address space of an application 135. Kernel memory is the area of memory used by operating system 134 and provides protection against access by processes. That is, when allocating memory for a resource, video memory manager 200 (e.g., via virtual memory manager 310 and physical memory manager 320) may allocate memory in the kernel memory portion of system memory 130 if there is not appropriate space in video memory 291. Also, video memory manager 200 may store the actual mappings from handles or virtual addresses to actual physical addresses in kernel memory to protect the mappings from being accessed by other applications. etc. Further, video memory manager 200 (e.g., via virtual memory manager 310 and physical memory manager 320) may evict resource video memory allocations to the kernel memory portion of system memory 130 and adjust the virtual memory mappings accordingly.

Alternatively, video memory manager 200 may not evict any resources, but maintain all resources in video memory 291. This type of allocation may be offered to driver 210 by means of directly allocating physical video memory 291 that is not evictable. In such a case, drivers should keep the number of such allocations small, otherwise physical video memory 291 may get filled with unevictable allocations.

When visible through the non-local aperture 292, the video memory allocation may be locked in system memory (e.g., using MmProbeAndLockPages( ) mechanism) and mapped through non-local aperture 292. In this state, the bits of the video memory allocation still reside in the page file system but should remain present in physical system memory 130 because of the locking operation. To map the video memory allocation through the non-local aperture 292, a range is allocated in the aperture 292 itself, referred to herein as a non-local aperture allocation.

Application Access to Graphics Data

When application 135 sends a rendering command to driver 210 that references an allocation, driver 210 informs video memory manager 200 about the reference so that video memory manager 200 can load the surface in some accessible physical memory for GPU 290. If the surface is currently in system memory 130, video memory manager 200 may look at flags of the surface and allocates the proper GPU resource (e.g., some address range of non-local aperture 292 or some address range of local video memory 291). If the surface was allocated in video memory 291, then the video memory manager 200 allocates memory from the physical memory manager 320. If the surface was allocated in non-local aperture 292, then the video memory manager 200 sends the virtual address of the allocation's system memory buffer to the non-local aperture allocator 330 which may lock the memory and map the memory through non-local aperture 292.

Static Video Memory Allocation and Management

FIG. 18 illustrates forming a static video memory allocation. When stored in system memory 130, static video memory allocation may reside in the private address space of the associated application. Allowing the application to directly access the bits of the static video memory allocation is typically acceptable because the application can directly control the content anyway and so any graphics data corruption should only affect that application and should not hang GPU 290.

In theory, video memory manager 200 could allocate a static video memory in system memory 130 only when the allocation is evicted to system memory 130 and could free the corresponding portion of system memory 130 when the allocation resides in local video memory 291. A disadvantage with this approach is that the virtual address space of the application is also used by the application itself for regular memory allocation. Thus, there is no guarantee that video memory manager 200 could allocate space in the private address space of the application for the static video memory allocation upon an eviction from video memory 291. Therefore, video memory manager 200 may keep the static video memory allocation of system memory 130 to save space for an eviction from physical video memory 291.

When video memory 291 is full, video memory manager 200 may evict a static allocation to make place for a new allocation. In such a case, video memory manager 200 brings the content of video memory 291 back to system memory 130. If the surface hasn't been modified since it was cached from system memory 130, then the content of video memory 291 may be discarded. If the content was modified, then non-local aperture manager 330 may map the system memory allocation through non-local aperture 292 and request driver 210 to transfer the content of video memory 291 to that buffer. Once the transfer is completed, the surface is unmapped from non-local aperture 292.

If the surface is currently mapped through non-local aperture 292, the eviction is relatively easy. As explained before, an allocation visible through the non-local aperture 292 has its virtual address referencing the pages in system memory 130. The pointer remains the same whether or not non-local aperture 292 is redirecting GPU 290 to the same physical pages. Because of this, removing the redirection range in non-local aperture 292 has no effect on the application accessing the surface through the CPU page table. Thus, to evict the surface from non-local aperture 292, video memory manager 200 reclaims the previously reserved range in aperture 292 that was being redirected to that allocation and unlocks the page from system memory 130 so the operating system memory manager can page them out to hard disk 141. That is, video memory manager 200 may unmap unused allocations from non-local aperture 292. The ranges of non-local aperture 292 that were unmapped can then be reclaimed by video memory manager 200 (and subsequently reused for other allocations to be accessed by GPU 290)

Evicting from physical video memory 291 is more complex than evicting from non-local aperture 292. When the eviction occurs while the surface is in video memory 291, video memory manager 200 allocates pages in system memory 130 for the allocation, copies the content of the surface from video memory 291 to these allocated pages, and remaps the user mode virtual address to reference the newly allocated pages. This entire process should occur while the application can actually be accessing the virtual address that needs to be copied and remapped. This may be handled by the memory manager of the operating system through the API MmRotatePhysicalView( ). This API allows rotation of the virtual address from a physical video memory location to a system memory location as an atomic operation as seen by the application.

Static allocations may be allocated from a heap that is created in each process the first time a static allocation is requested. The heap may be managed like a regular heap and the surfaces allocated as regular system memory. The linear address from the heap allocation may be associated with that allocation for it's life. Allocating a static buffer may include allocating the surface in the process video heap. Since there is no content for the surface at creation time, there is no need to actually allocate any video memory 291 or system memory 130 viewable through non-local aperture 292 at that time.

A memory heap is a range of virtual space, in the process private virtual memory space, for allocation of virtual memory. Typically, each video memory allocation gets a small portion of the heap. The heap may grow over time and can actually include multiple ranges of virtual space if the original range can't be grown. A heap may be used to reduce fragmentation of the address space of the application. The heap may be allocated as a rotatable virtual address range. In a rotatable range, video memory manager 200 can specify for each page of the heap, whether to refer to a location in the frame buffer or to be backed by a page of system memory 130.

Dynamic Video Memory Allocation and Management

Dynamic video memory allocations use a medium to hold the bits of the allocation and a virtual address referring those bits. Virtual memory manager 310 may use either physical video memory 291 or system memory 130 to hold the bits of a dynamic video memory allocation. While in physical video memory 291 the dynamic video memory allocation is associated with a physical video memory allocation (from physical video memory manager 320). In this state, the video memory allocation is directly visible to GPU 290 and can be used for rendering operations.

When the bits of the allocation are evicted from video memory 291, or mapped through the non-local aperture 292, video memory manager 200 allocates a portion of system memory 130 to store those bits. The system memory could potentially be allocated from either the kernel memory or the process space of the application. Since kernel memory is a limited resource that is shared among all applications, video memory manager 200 allocates from the process space of the application. Because system memory is allocated from the process space of the application, an application can access the bits of that allocation directly without going through the locking mechanism. Because the application controls the content of those allocations anyway, this isn't a security violation. This may result in unknown data being present on those allocations (which may result in a rendering artifact), but it typically won't affect other applications or hang GPU 290.

When the bits of an allocation reside in system memory 130, they can't be directly accessed by GPU 290 unless the physical system pages forming the buffer of system memory are made visible through non-local aperture 292. In that state, the dynamic video memory allocation will be associated with a range of non-local aperture address space allocated by the non-local aperture manager 330. The non-local aperture hardware of GPU 290 redirects that address space to the appropriate physical pages in system memory 130.

In theory, the virtual address referring to the bits of the allocation is used only when the application accesses those bits or when the surface is in system memory 130 (to hold the content of the allocation). Thus, when the surface is currently cached in video memory 291 and the surface isn't being accessed by the application, the virtual address isn't needed. However not having a virtual address associated with the allocation at all time may cause a problem when video memory manager 200 transitions the allocation from one state to another because it might not be able to allocate that virtual address if the application process space doesn't contain a range large enough for the allocation. In that case, it is possible that a surface couldn't be evicted from video memory 291 because of not enough free memory in system memory 130.

For this reason, video memory manager 200 may associate a virtual address to a dynamic video memory allocation when it's first allocated and store the virtual address as long as the allocation exists. This way, video memory manager 200 has the virtual address when changing the state of the allocation. Similarly, that virtual address is typically committed up front rather than waiting until eviction time.

Figure 11:
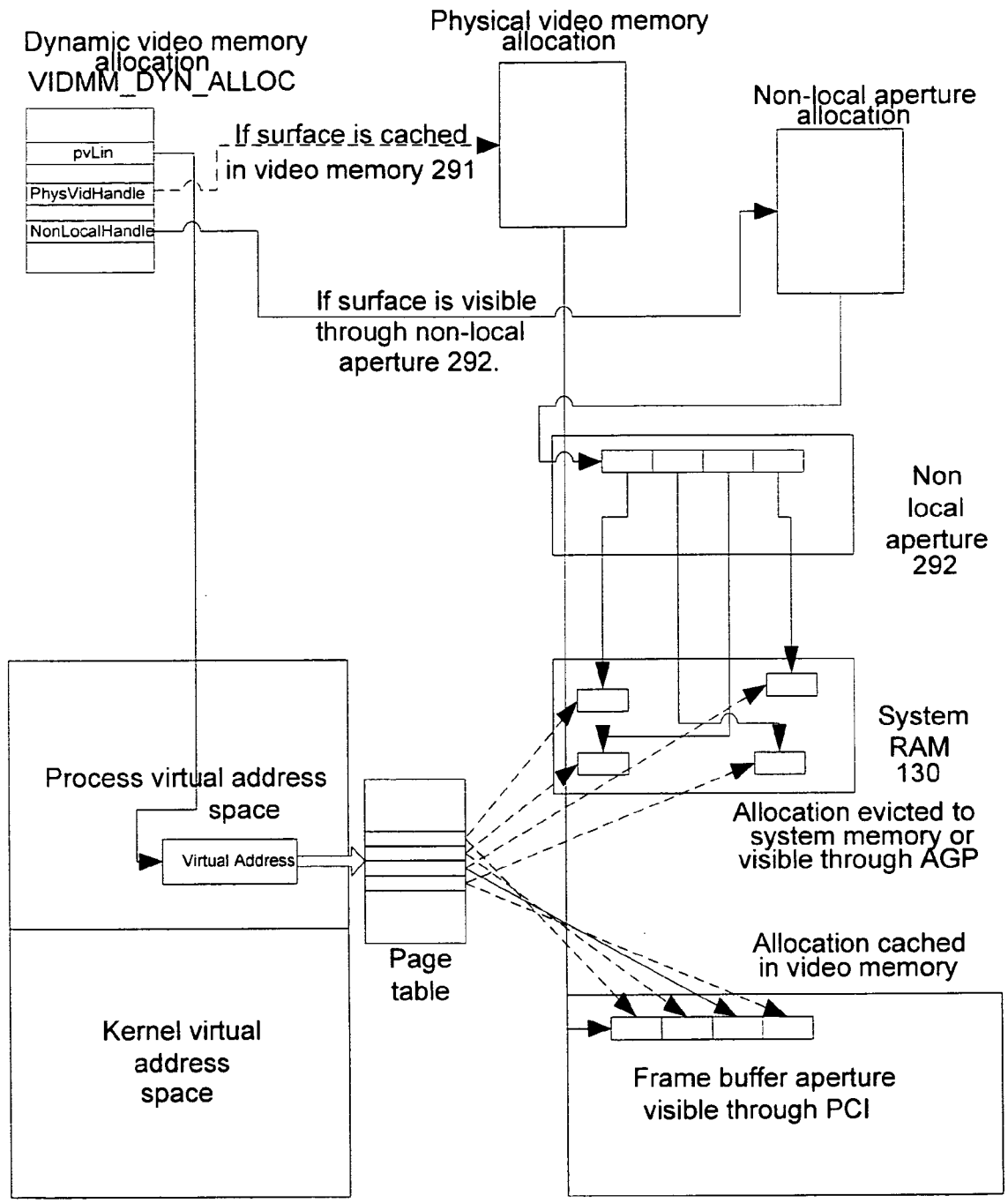
FIG. 11 is a block diagram showing an illustrative dynamic video memory allocation in accordance with an embodiment of the invention.

FIG. 11 illustrates forming a dynamic video memory allocation. For a dynamic video memory allocation, a locking mechanism is available to applications to allow them to directly access the virtual address allocated inside their process address space. The virtual address can reference actual physical video memory 291 (visible through the pci frame buffer aperture) or the physical system pages of system memory 130.

The application 135 may call the Lock( ) function to obtain the virtual address. When the application is done with the access, it may call the Unlock( ) function to allow GPU operations on the allocation to resume. The application may call the Lock( ) function before accessing the content of the allocation to insure that the driver had a chance to flush all graphics operations for that allocation. Graphics operations (or dma) referencing the allocation should not be sent to GPU 290 while the surface is being accessed by the application.

The application 135 typically cannot determine the actual physical location of the allocation when it's accessing it through the virtual address. Furthermore, the actual physical location can be modified while the allocation is being accessed. Video memory manager 200 could decide, for example, to evict the surface being accessed out of video memory 291 to make room for another allocation. This eviction process is transparent to application 135 and doesn't result in any loss of content.

The granularity of the virtual address may define the granularity of the allocation to protect each process's video memory from one another. Similarly, because of the way virtual memory works, the lower "n" bits of a virtual address are really the offset within the physical page where the bits are being held. Thus those "n" lower bits of the virtual address are the same as the "n" lower bits of the physical address, which means that once a surface has been allocated at a specified offset within a page it remains at that relative offset within the new medium even if remapped to a new location. For example, evicting an allocation out of video memory 291 while being accessed by application 135 implies having a virtual address in system memory 130 that has the same lower "n" bits as the current location in physical video memory 291. The same is true when bringing the surface back to video memory 291. Therefore, video memory manager 200 may find a location in video memory 291 that has the same lower "n" bits as the virtual memory for that allocation.

One mechanism to allocate the virtual address associated with a dynamic video memory allocation may be a memory manager of operating system 134 (also referred to herein as Mm) that supports a rotatable virtual address description (VAD). When the content of the allocation isn't present in physical video memory 291, the VAD may be rotated to regular pageable system memory 130. When the allocation is brought in to physical video memory 291, the VAD is MEM_RESET so that Mm can reuse the physical pages that were used without transferring the content to the page file on disk. At the first lock operation, the VAD is rotated to the physical memory location where the surface resides in physical video memory 291. The VAD isn't rotated back on an unlock, instead the VAD referencing the physical video memory location is stored until the allocation is either moved in video memory 291, freed or evicted to system memory 130.

Using this mechanism, video memory manager 200 can control the virtual address space of the application on the natural page size of computing environment 100 (e.g., 64 K), which means that allocations are expanded to the next page size. To reduce the impact of this expansion, video memory manager 200 may distinguish between big allocations and small allocations. Video memory manager 200 may align a big allocation to the natural page size and video memory manager 200 may pack small allocations inside of chunks to conserve space. The chunks may be managed by the video memory manager 200 similar to regular dynamic video memory allocations. When video memory manager 200 changes the state of one surface within the chunk, it may change the state of all the sub-allocations. A virtual memory chunk is a range of virtual space in the process private virtual memory space. It is similar to a process video memory heap except that it typically holds only a few surfaces. The surfaces in the virtual memory chunk may be moved in and out of local video memory 291 by video memory manager 200.

Figure 12:
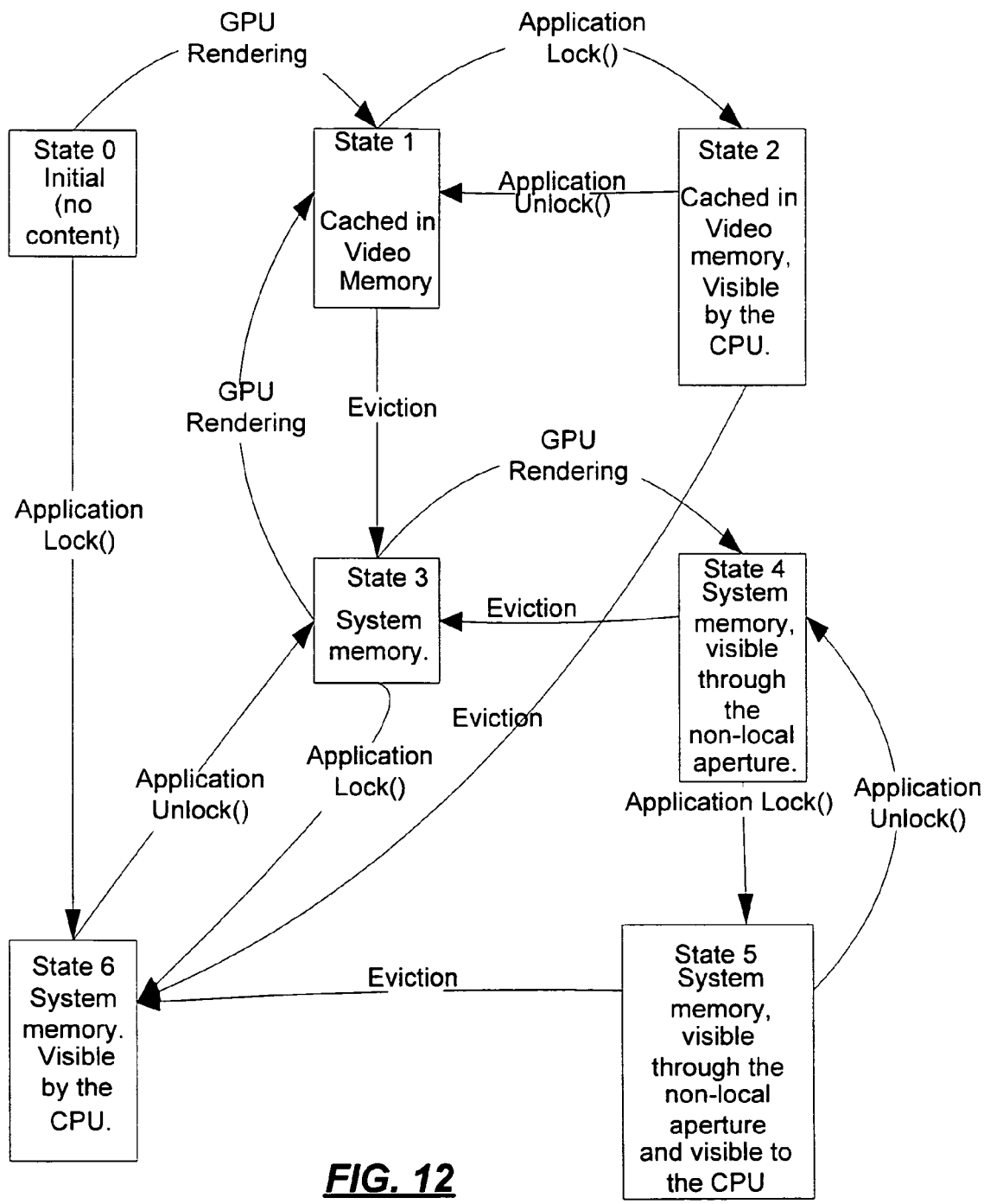
FIG. 12 is a block diagram showing an illustrative state diagram including illustrative states of dynamic video memory allocation in accordance with an embodiment of the invention.

FIG. 12 illustrates a state diagram showing illustrative states of a dynamic video memory allocation. In the initial state (state zero), the dynamic video memory allocation is allocated but doesn't have a content yet. Thus, the content of the allocation is unknown. If application 135 uses the allocation as the source of a GPU operation, the result of the rendering will be unknown. To get content into the allocation, application 135 can use GPU 290 to render into it (which brings the allocation to state one) or application 135 can lock the surface and manually put content into the allocation using the CPU (which brings the allocation to state six).

In state one, the bits of the allocation reside in physical video memory 291. In this case, the dynamic video memory allocation is associated with a physical video memory allocation from the physical video memory manager 320. In state one, there doesn't need to be a virtual address referring to physical video memory 291 as the allocation doesn't need to be accessible. Physical memory could be allocated from a segment that is visible or not visible to CPU 120. From state one, the allocation can be locked by application 135 for direct CPU access or evicted out of video memory 291 to make room for another allocation. In state one, the rotatable VAD for the allocation could be either referring to system memory, if the allocation hasn't be locked yet at it's current location, or rotated to the physical video memory location otherwise.

In state two, the bits of the allocation reside in physical video memory 291 and the rotatable VAD is currently rotated to the physical video memory location where the allocation resides. Thus, the bits of the allocation can be allocated from a segment that is visible to CPU 120. If the surface was originally allocated from a segment not visible to CPU 120 (e.g., in state one) the allocation may be moved to a segment that is visible before the allocation reaches state two. While in state two, application 135 typically does not send rendering commands to GPU 290 referring to the allocation. First, application 135 relinquishes its hold on the virtual address associated with the surface. While in state two, the surface can still get evicted to system memory 130. In this case, the VAD is rotated to system memory 130 and the memory manager of the operating system may ensures that this process appears atomic to application 135 (i.e. the application's access to the virtual address will continue normally during the transfer and no content is lost).

In state three, the bits of the allocation reside in regular pageable system memory 130. Thus, the dynamic video memory allocation is no longer associated with a physical video memory allocation. In state three, the rotatable VAD may be rotated back to system memory 130. Even though a virtual address to the bits of the allocation are accessible by application 135, application 135 should not try to access those bits while in state three since the runtime may not synchronize accesses with a GPU rendering command. If application 135 requests a rendering command referencing the allocation, the allocation is brought back to state one or four before GPU 290 can access the allocation.

In state four, video memory manager 200 has decided to make the allocation visible through non-local aperture 292. In state four, the bits of the allocation still reside in system memory 310 (e.g., VAD rotated to system memory 130).

However, the pages are locked in place and cannot be paged to hard disk 141. The GPU can access the allocation through the non-local aperture range directly. Similar to state three, an application should not use the virtual address referencing the allocation directly as this virtual address isn't guaranteed to contain data in the format the application expects or even be valid (e.g., the allocation could transition into another state).

In state five, the allocation is visible through non-local aperture 292, however, the application may directly access the virtual address referring to the physical system pages of the allocation. While in state five, video memory manager 200 keeps the virtual address valid and may refuse any GPU rendering command referencing the allocation until application 135 relinquishes its hold on the allocation. In this case, evicting the surface out of non-local aperture 292 doesn't have any consequences on application 135 because the virtual address remains the same except that the non-local aperture 292 no longer redirects a range to physical system pages referred to by the virtual address.

In state six, the allocation is in system memory 130, like state three, except that application 135 may access the bits of the allocation directly. In state six, application 135 shouldn't send rendering commands to GPU 290 that reference the allocation (the application should first relinquish hold of the virtual address).

Figure 13:
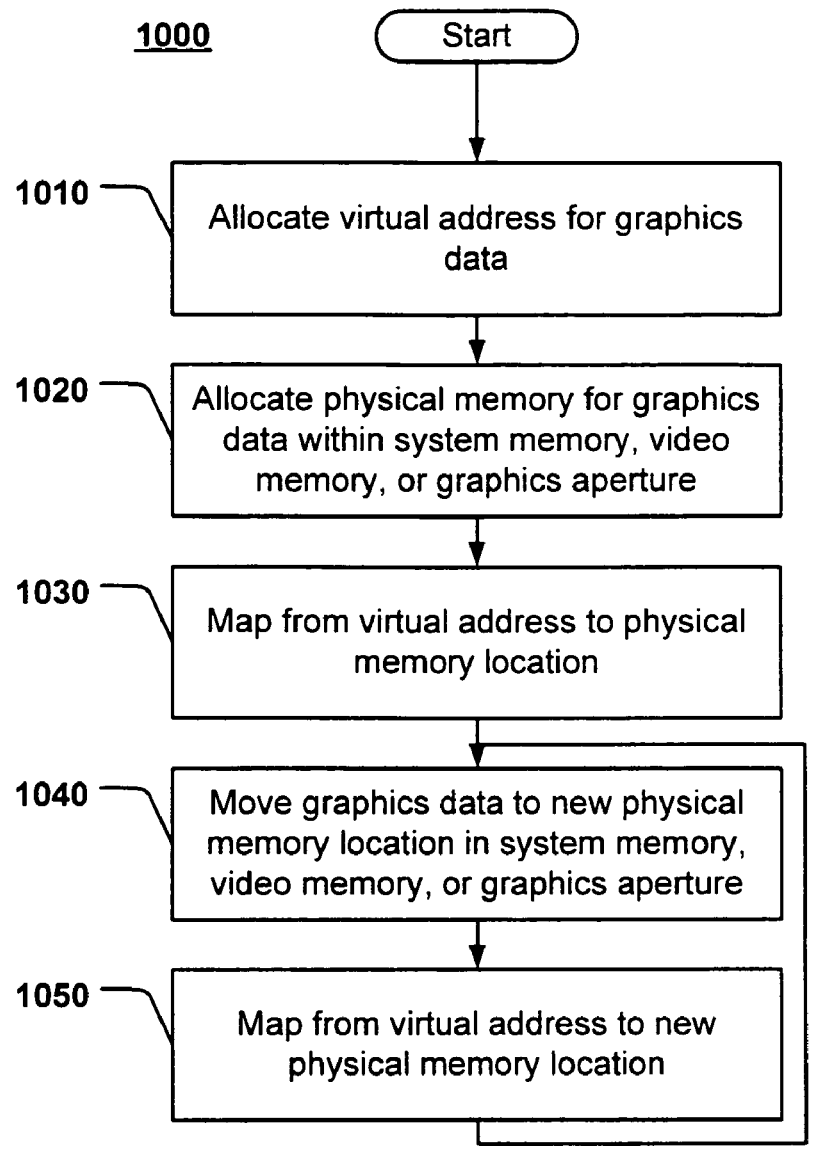
FIG. 13 is a flow diagram of an illustrative method for video memory management in accordance with an embodiment of the invention.

FIG. 13 shows an illustrative method 1000 for video memory management. While the description of FIGS. 13 and 14 refer to various managers (e.g., physical memory manager 320, etc.) it should be appreciated that the method could be implemented with a single manager, or any number of managers. Further, the various functionalities may be distributed among the various managers in any convenient fashion.

As shown in FIG. 13, at step 1010, virtual memory manager 310 allocates virtual memory for referencing some physical memory, which in turn stores the graphics data.

At step 1020, physical memory manager 320 allocates the physical memory to store the graphics data. The physical memory may be located in video memory 291, may be located in system memory 130 and not accessible via aperture 292, may be located in system memory 130 and accessible via aperture 292, and the like.

At step 1030, virtual memory manager 310 maps from the virtual address allocated in step 1010 to the physical address allocated at step 1020. In this manner, by working with virtual addresses, application 135 or driver 210 may request the graphics data without having to know where the graphics data is currently stored.

At step 1040, video memory manager 200 moves the graphics data from one physical location to another physical location, from being mapped through aperture 292 to not being mapped through aperture 292, and the like. At step 1050, virtual memory manager 310 maps from the virtual address to the "new" physical address.

Figure 14:
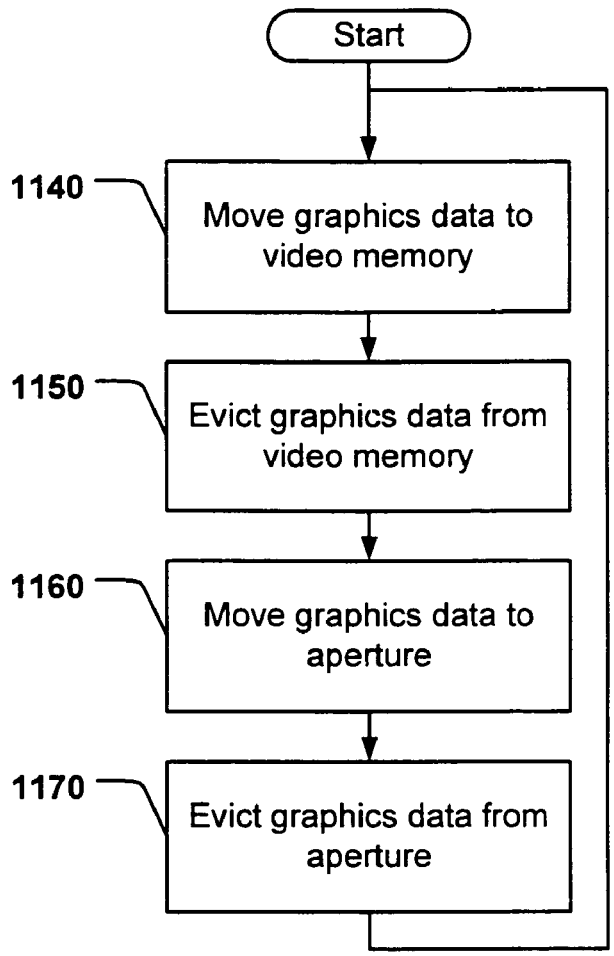
FIG. 14 is a flow diagram of another illustrative method for video memory management in accordance with an embodiment of the invention.

FIG. 14 illustrates more details of step 1040. While FIG. 14 shows four steps, each step may be individually executed, and the steps may be executed in any order. Video memory manager 200 may decide which step to execute based on when a particular physical memory is full, based on trying to balance GPU access between multiple applications, and the like. As shown in FIG. 14, at step 1140, video memory manager 200 moves graphics data to video memory 291. At step 1150, video memory manager 200 evicts graphics data from video memory 291. At step 1160, video memory manager 200 makes graphics data in system memory 130 accessible through aperture 292. At step 1170, video memory manager 200 evicts graphics data from being accessible through aperture 292. Video memory manager 200 may execute each step differently depending on the type of graphics data.

For example, for a resource, such as an application resource or a driver resource, virtual memory manager 310 may allocate and commit a kernel virtual address range for the resource, resource. To bring the resource to local video memory 291, physical memory manager 320 may allocate memory in local video memory 291 for containing the resource and may cause the resource to be copied from memory corresponding to the committed kernel virtual address range to the memory allocated in local video memory 291. Virtual memory manager 310 may map the kernel virtual address range to the memory allocated in local video memory 291.

To evict the resource from local video memory 291, physical memory manager 320 may cause the resource to be copied from the memory allocated in local video memory 291 to memory corresponding to the committed kernel virtual address range and then free the memory allocated in local video memory 291. Virtual memory manager 310 may free the mapped kernel virtual address range.

To bring the resource "into" aperture 292, physical memory manager 320 may lock the committed kernel virtual address range, whereby the operating system does not have permission to page out the resource from the system memory corresponding to the committed kernel virtual address range. Graphics processing unit aperture manager 330 may allocate an address range in aperture 292 for redirection to the resource and may cause the address range in aperture 292 to be mapped to the committed kernel virtual address range.

To evict the resource from aperture 292, graphics processing unit aperture manager 330 may unmap and free the address range allocated in aperture 292. Physical memory manager 320 may unlock the committed kernel virtual address range, whereby the operating system has permission to page out the resource from the system memory corresponding to the committed kernel virtual address range.

Alternatively, a resource may be permanently allocated in video memory 291 or aperture 292. To permanently allocate memory in video memory 291, physical memory manager 320 may allocate memory for the resource in the local video memory and not evict the allocated memory from local video memory. Virtual memory manager 310 may allocate and commit a kernel virtual address range for the resource and map the kernel virtual address range to the memory allocated in local video memory.

To permanently allocate memory in video memory 291, virtual memory manager 310 may allocate and commit a kernel virtual address range for the resource. Physical memory manager 320 may lock the committed kernel virtual address range, whereby the operating system does not have permission to page out the resource from the system memory corresponding to the committed kernel virtual address range. Graphics processing unit aperture manager 330 may allocate an address range in aperture 292 for redirection to the resource and cause the allocated address range in aperture 292 to be mapped to the committed kernel virtual address range.

For static surfaces, virtual memory manager 310 may allocate and commit an application private virtual address range for the surface. To bring the static surface into video memory 291, physical memory manager 320 may allocate memory in local video memory 291 for containing the surface and cause the surface to be copied from memory corresponding to the committed application private virtual address range to the memory allocated in local video memory 291.

To evict the static surface, physical memory manager 320 may cause the surface to be copied from the memory allocated in local video memory 291 to memory corresponding to the committed application private virtual address range and then free the memory allocated in local video memory 291.

To bring the static surface "into" aperture 292, physical memory manager 320 may lock the committed application private virtual address range, whereby the operating system does not have permission to page out the surface from the system memory corresponding to the application private virtual address range. Graphics processing unit aperture manager 330 may allocate an address range in aperture 292 for redirection to the surface and cause the address range in aperture 292 to be mapped to the committed application private virtual address range.

To evict the static surface from aperture 292, graphics processing unit aperture manager 330 may unmap and free the allocated graphics processing unit aperture address range. Physical memory manager 320 may unlock the committed application private virtual address range, whereby the operating system has permission to page out the surface from the system memory corresponding to the committed application private virtual address range.

For dynamic surfaces, virtual memory manager 310 may allocate and commit an application private virtual address range for the surface. To bring the dynamic surface into local video memory 291, physical memory manager 320 may allocate memory in local video memory 291 for containing the surface and cause the surface to be copied from the memory corresponding to the committed application private virtual address range to the memory allocated in local video memory 291. Virtual memory manager 310 may map the committed application private virtual address range to the memory allocated in local video memory 291.

To evict the dynamic surface from video memory 291, physical memory manager 320 may cause the surface to be copied from the memory allocated in local video memory 291 to memory corresponding to the committed application private virtual address range and may then free the allocated memory in local video memory 291. Virtual memory manager 310 may then remap the committed application private virtual address range to the memory corresponding to the committed application private virtual address range.

To bring the dynamic surface "into" aperture 292, physical memory manager 320 may lock the committed application private virtual address range, whereby the operating system does not have permission to page out the surface from the system memory corresponding to the application private virtual address range. Graphics processing unit aperture manager 330 may allocate an address range in aperture 292 for redirection to the surface and causes the address range in the graphics processing unit aperture to be mapped to the committed application private virtual address range.

To evict the dynamic surface from aperture 292, graphics processing unit aperture manager 330 may unmap and free the allocated graphics processing unit aperture address range. Physical memory manager 320 may unlock the committed application private virtual address range, whereby the operating system has permission to page out the surface from the system memory corresponding to the committed application private virtual address range.

Illustrative application programming interfaces are given below for dynamic video memory allocation and deallocation.

```
NTSTATUS
VidMmAllocateDynamic(
    IN PVOID HwDeviceExtension,
    IN DWORD dwFlags,
    IN SIZE_T Size,
    IN ULONG ulAlignment
    OUT PHANDLE Handle);
```

```
NTSTATUS
VidMmFreeDynamic(
    IN PVOID HwDeviceExtension,
    IN HANDLE Handle);
```

Allocating a dynamic video memory allocation may be performed in two steps. First, the virtual address of the allocation is allocated. Second, the actual GPU resources (e.g., physical video memory 291, non-local aperture 292) to store the bits are allocated (typically after the allocation creation time and upon the first application access to the allocation).

Video memory manager 200 may store bits in system memory 130 by rotating the virtual address associated with the allocation back to system memory.

Video memory manager 200 may make an allocation visible through non-local aperture 292 by making sure the allocation bits are in system memory 130 then pinning down or locking the pages forming the allocation in physical system memory 130 so that the paging system doesn't send them to disk. Once the pages are locked, video memory manager 200 may allocate a range in non-local aperture 292 that is visible to GPU 290 and reprogram aperture 292 to redirect that range to the physical system memory pages. The allocation of address space in non-local aperture 292 may be done through non-local aperture manager 330. Once visible or accessible through non-local aperture 292, a dynamic video memory allocation may be associated with a handle from non-local aperture manager 330.

Video memory manager 200 may store bits of video memory 291 by using physical video memory manager 320 to allocate a range of physical video memory 291 in one of the physical memory segments defined by the driver. Since dynamic allocation is visible to CPU 120, virtual memory manager 310 looks at the segments that have been defined as visible by CPU 120.

If more than one segment could hold the allocation, virtual memory manager 310 chooses a segment. The choice may be made by trying to maximize the balance of allocation in each segment. Rules for such balancing include: if a heap has a free hole big enough for the allocation, use it; if a heap has a lot more free memory than another, use it use the heap with the oldest allocation; and the like.

Once the content of the surface is transferred to physical video memory 291, the virtual address may be MEM_RESET so the memory manager of the operating system 134 won't send the pages to hard disk 141. The virtual address is rotated to the physical video memory address on the first lock, and remains referring to system memory 130. An illustrative application programming interface is given below for beginning GPU access.

```
NTSTATUS
VidMmBeginGPUAccess(
    IN PVOID HwDeviceExtension,
    IN PHANDLE phAlloc,
    IN VIDMM_FENCE Fence,
    OUT PBOOLEAN NonLocalVideo,
    OUT PPHYSICAL_ADDRESS PhysAddr
);
```

Hardware not supporting demand paging of video memory specifies which allocations will be used by the hardware before posting a command buffer to GPU 290 so that video memory manager 200 can make those allocations visible to GPU 290. The notification may be done through VidMmBeginGPUAccess( ) API. (The duration of access may be controlled by a fencing mechanism, described below).

When VidMmBeginGPUAccess( ) is called, video memory manager 200 verifies if the allocations are currently visible to GPU 290. If the allocations are not visible to GPU 290, video memory manager 200 brings the allocations to local physical video memory 291 or non-local video aperture 292. Video memory manager 200 may go through the list of allocations provided by driver 210 and try to make all of them visible to GPU 290 by allocating physical video memory 291 or mapping through non-local aperture 292. When trying to allocate GPU resources, it's possible that the allocation fails because there isn't enough free room. When this happens physical memory manager 320 or non-local aperture manager 330 tries to evict some unused allocation to make room for the new one. Video memory manager 200 may not be able to allocate memory immediately but may wait until GPU 290 is done with some surface. It is possible that the function will fail to bring the allocations back in memory. If the call fails, driver 210 may break down the command buffer in smaller pieces and call video memory manager 200 again for each subset of allocation.

Once the allocations are in physical video memory 291 or mapped through non-local aperture 292, they may remain there as long as they are being used by GPU 290. To determine when an allocation is no longer in use, a fencing mechanism may be used. The fence may be a 64 bit monotonic counter that is updated by the display hardware, GPU 290, each time a partial command buffer is completed.

Figure 15:
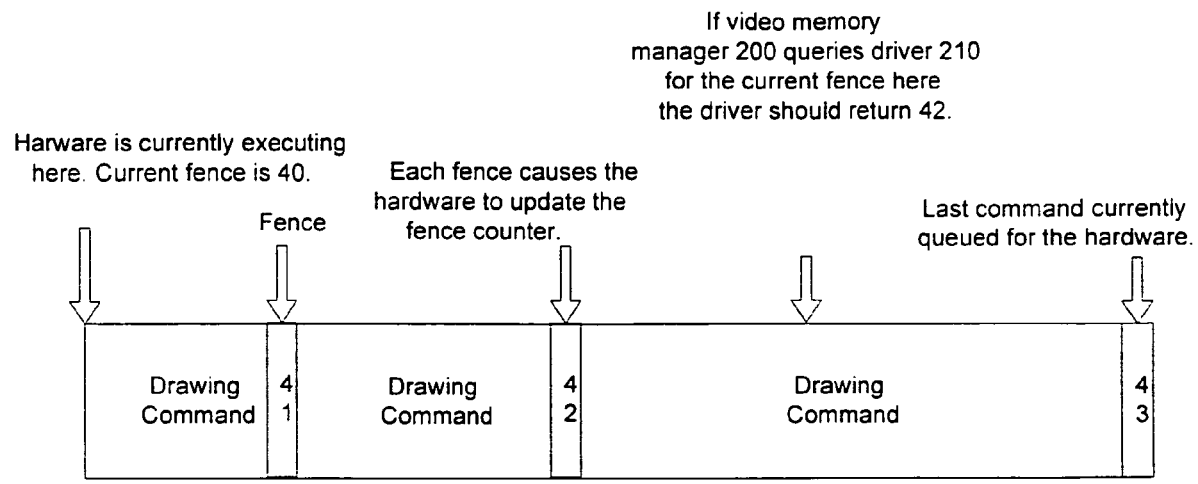
FIG. 15 is a diagram depicting an illustrative usage of a fence in video memory management in accordance with an embodiment of the invention.
Figure 16:
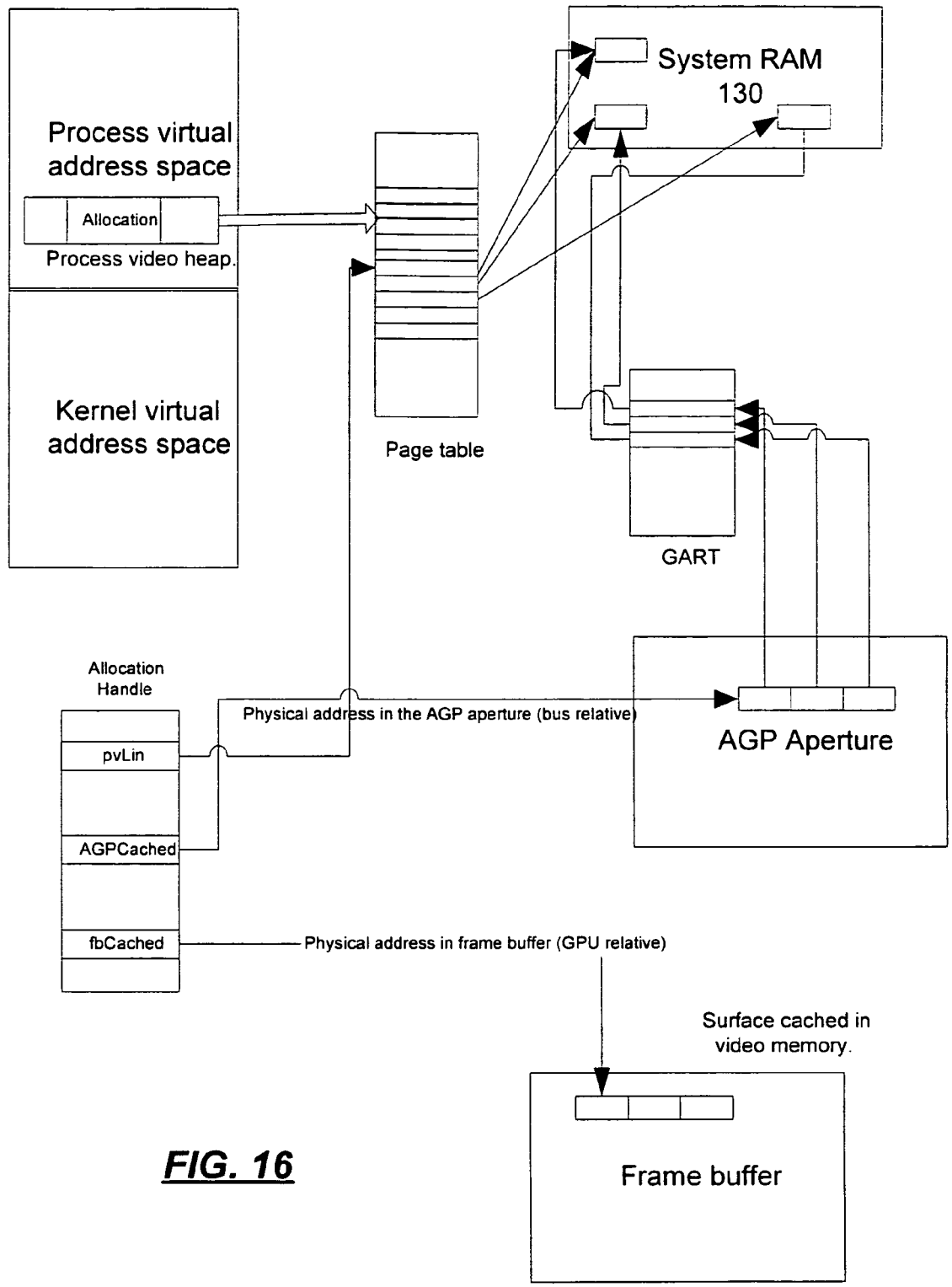
FIG. 16 is a block diagram showing an illustrative static video memory allocation in accordance with an embodiment of the invention.

FIG. 15 depicts the usage of a fence for coordination between video memory manager 200 and driver 210. Using the fence, video memory manager 200 can determine if an allocation is currently busy (in use or shortly to be in use by GPU 290) by comparing the fence associated with an allocation with the last fence processed by GPU 290.

VidMmBeginGPUAccess may also acquire usage information about the allocations. Because driver 210 may notify video memory manager 200 each time GPU 290 requests the use of an allocation, this is a good place to build usage information. This usage information may be used by video memory manager 200 when physical video memory 291 or non-local aperture 292 is full and video memory manager 200 wants to find a candidate allocation for eviction. Each time an allocation is used, it may be put at the end of a list of allocations. Thus, when video memory manager 200 wants to evict an allocation it can use that ordered list to find the best candidate. Video memory manager 200 can also compare the last fence of an allocation to the last fence GPU 290 processed to generate an estimate of how long ago the allocation was used.

When application 135 desires direct access to a dynamic surface, it may use the lock mechanism provided by Direct X runtime. When application 135 locks a surface, the runtime calls driver 210 with the lock request. Driver 210 then verifies which actual allocation to return to application 135, and may call VidMmBeginUserAccess( ) function (illustrative API shown below) in video memory manager 200 to get the linear address that was allocated for application 135 at creation time. If the virtual address is still referencing system memory 130, it may be rotated to the current location of the surface in video memory 291 before being returned.

```
NTSTATUS
VidMmBeginUserAccess(
    IN PVOID HwDeviceExtension,
    IN HANDLE hAlloc,
    OUT PVOID pvLin
);
```

```
NTSTATUS
VidMmEndUserAccess(
    IN PVOID HwDeviceExtension,
    IN HANDLE hAlloc
);
```

VidMmBeginUserAccess( ) doesn't have to page in or evict the allocation; rather, it can safely keep the allocation at its current location and let driver 210 access the allocation. If the allocation is in video memory 291 and is to be reclaimed while it's being accessed, the eviction process can ensure there's no loss of data during the transfer. An illustrative eviction API is given below.

```
NTSTATUS
VidMmEvict(
    IN PVOID HwDeviceExtension,
    IN HANDLE hAlloc
);
```

Hardware Considerations

There are some characteristics of GPU hardware that may affect the implementation of video memory manager 200 and driver 210. Those characteristics include a GPU programmable aperture and demand paging.

A GPU programmable aperture is used by some GPU hardware to give a virtual view of video memory 291 to GPU 290. Each application 135 has its own virtual view of video memory 291 and each allocation done for that application is allocated a contiguous range within a private aperture. For hardware that doesn't support a GPU programmable aperture, video memory manager 200 may allocate contiguous blocks of memory. Allocating large contiguous block may be inefficient and may cause lots of eviction. Allocating on a page basis may reduce fragmentation.

A GPU programmable aperture may be useful for protecting video memory 291. Since each application may have its own private aperture, each application will see (via GPU 290) surfaces allocated for that application. When GPU 290 is running in one application's context it is not be able to access any video memory that wasn't allocated for that application. If GPU 290 tries to access an address in the aperture that wasn't allocated to that application, an interrupt is generated by GPU 290 and video memory manager 200 may inject an exception in the application causing a fault (blocking any further rendering from that application until it reinitialized its context).

Demand paging is a mechanism by which some GPUs indicate that the GPU desires access to a surface that is not currently cached in video memory 291. With old GPU hardware, video memory manager 200 may confirm that all surfaces referenced by a command buffer are cached in video memory 291 before submitting the command buffer to GPU 290. Since there is no way for video memory manager 200 to determine which surfaces will actually be used by GPU 290, it load all of those surfaces entirely. If a command buffer is built in user mode, kernel mode components may parse the command buffer to load all those surfaces in video memory 291 before submitting the command buffer to GPU 290. Since the command buffer is located in uncached memory, reading from that buffer is very inefficient. Also, a command buffer might be referencing more memory than can actually be loaded at once, which requires that the driver submit the command buffer into multiple sub-buffers.

In order to make this process more efficient, some GPUs can support demand paging. Demand paging may use a GPU programmable aperture. The aperture contains present flags for all pages of each surfaces. If a page being accessed is currently not present, the GPU signals an interrupt. In response to the interrupt, video memory manager 200 may take control of CPU 120 and bring the pages in from system memory 130 and restart the graphics operation that caused the fault.

Program code (i.e., instructions) for performing the above-described methods may be stored on a computer-readable medium, such as a magnetic, electrical, or optical storage medium, including without limitation a floppy diskette, CD-ROM. CD-RW, DVD-ROM, DVD-RAM, magnetic tape, flash memory, hard disk drive, or any other machine-readable storage medium, wherein, when the program code is loaded into and executed by a machine, such as a computer, the machine becomes an apparatus for practicing the invention. The invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the above-described processes. When implemented on a general-purpose processor, the program code combines with the processor to provide an apparatus that operates analogously to specific logic circuits.

It is noted that the foregoing description has been provided merely for the purpose of explanation and is not to be construed as limiting of the invention. While the invention has been described with reference to illustrative embodiments, it is understood that the words which have been used herein are words of description and illustration, rather than words of limitation. Further, although the invention has been described herein with reference to particular structure, methods, and embodiments, the invention is not intended to be limited to the particulars disclosed herein; rather, the invention extends to all structures, methods and uses that are within the scope of the appended claims. Those skilled in the art, having the benefit of the teachings of this specification, may effect numerous modifications thereto and changes may be made without departing from the scope and spirit of the invention, as defined by the appended claims.

What is claimed:

1. A method for video memory management in a computer environment having a main processing unit for executing an operating system and an application, a system memory, and a graphics processing unit having a local video memory and an aperture that maps between a portion of system memory and the graphics processing unit, the method comprising:

managing the physical memory of the local video memory and at least of portion of the physical memory of the system memory;

managing the memory mappings between a portion of system memory and the graphics processing unit, such that video data in the system memory is accessible to the graphics processing unit via the aperture;

allocating virtual memory and maintaining mappings between the allocated virtual memory and the physical memory of the local video memory, the physical memory of the system memory, and the physical memory of the system memory accessible via the aperture; and maintaining a list of allocations of physical memory according to a least-recently-used algorithm.

2. The method as recited in claim 1 further comprising:

allocating and committing an application private virtual address range for a surface, the surface not being directly accessible by the application via the main processing unit.

3. The method as recited in claim 2, further comprising:

allocating memory in the local video memory for containing the surface; and causing the surface to be copied from memory corresponding to the committed application private virtual address range to the memory allocated in the local video memory.

4. The method as recited in claim 3, further comprising:

causing the surface to be copied from the memory allocated in the local video memory to memory corresponding to the committed application private virtual address range; and freeing the memory allocated in the local video memory.

5. The method as recited in claim 2, further comprising:

locking the committed application private virtual address range, whereby the operating system does not have permission to page out the surface from the system memory corresponding to the application private virtual address range;

allocating an address range in the graphics processing unit aperture for redirection to the surface; and causing the address range in the graphics processing unit aperture to be mapped to the committed application private virtual address range.

6. The method as recited in claim 5, further comprising:

unmapping and freeing the allocated graphics processing unit aperture address range; and unlocking the committed application private virtual address range, whereby the operating system has permission to page out the surface from the system memory corresponding to the committed application private virtual address range.

7. The method as recited in claim 1, further comprising:

allocating and committing an application private virtual address range for a surface, the surface being directly accessible by the application via the main processing unit.

8. The method as recited in claim 7, further comprising:

allocating memory in the local video memory for containing the surface;

causing the surface to be copied from the memory corresponding to the committed application private virtual address range to the memory allocated in the local video memory; and mapping the committed application private virtual address range to the memory allocated in the local video memory.

9. The method as recited in claim 8, further comprising:

causing the surface to be copied from the memory allocated in the local video memory to memory corresponding to the committed application private virtual address range;

freeing the allocated memory in the local video memory; and remapping the committed application private virtual address range to the memory corresponding to the committed application private virtual address range.

10. The method as recited in claim 7, further comprising:

locking the committed application private virtual address range, whereby the operating system does not have permission to page out the surface from the system memory corresponding to the application private virtual address range;

allocating an address range in the graphics processing unit aperture for redirection to the surface; and causing the address range in the graphics processing unit aperture to be mapped to the committed application private virtual address range.

11. The method as recited in claim 10, further comprising:

unmapping and freeing the allocated graphics processing unit aperture address range; and unlocking the committed application private virtual address range, whereby the operating system has permission to page out the surface from the system memory corresponding to the committed application private virtual address range.

12. The method as recited in claim 1, further comprising:

determining whether a set of graphics data to be stored in a memory is larger than a predefined size; and if the set of graphics data is larger than the predefined size, allocating memory that is a multiple of a page size of the operating system and storing only the set of graphics data in the allocated memory; and if the set of graphics data is not larger than the predefined size, allocating memory that is a multiple of a page size of the operating system and storing the set of graphics data in the allocated memory along with other sets of graphics data.

13. The method as recited in claim 1, further comprising:

querying the graphics processing unit for an indication of a command that was last processed by the graphics processing unit;

receiving, from the graphics processing unit, an indication of a command that was last processed by the graphics processing unit; and determining which allocation to evict based on the indication of the command that was last processed by the graphics processing unit.

14. The method as recited in claim 13, wherein the indication of the command that was last processed by the graphics processing unit comprises a monotonic counter that is updated by the graphics processing unit each time a partial command buffer is completed.

15. The method as recited in claim 1, further comprising:

queuing a marker into a rendering stream communicated to the graphics processing unit;

querying the graphics processing unit for an indication of a marker that was last processed by the graphics processing unit; and determining which allocation to evict based on the indication of the marker that was last processed by the graphics processing unit.

16. The method as recited in claim 1, further comprising:

associating a handle with graphics data, the handle being a unique and permanent representation of the graphics data, the graphics data being stored at a physical address;

converting, upon a request including the handle, the handle to the physical address.

17. The method as recited in claim 1, further comprising:

time stamping graphics data with a fence identification; and marking the graphics data as a candidate for eviction based upon the timestamped fence identification.

18. The method as recited in claim 1, further comprising:

allocating and committing an application private virtual address range for a surface, the surface not being directly accessible by the application via the main processing unit.

19. The method as recited in claim 18, further comprising:

locking the committed application private virtual address range, whereby the operating system does not have permission to page out the surface from the system memory corresponding to the application private virtual address range;

allocating an address range in the graphics processing unit aperture for redirection to the surface; and causing the address range in the graphics processing unit aperture to be mapped to the committed application private virtual address range.

20. The method as recited in claim 18, further comprising:

unmapping and freeing the allocated graphics processing unit aperture address range; and unlocking the committed application private virtual address range, whereby the operating system has permission to page out the surface from the system memory corresponding to the committed application private virtual address range.

21. A method for video memory management in a computer environment having a main processing unit for executing an operating system and an application, a system memory, and a graphics processing unit having an aperture that maps between a portion of system memory and the graphics processing unit, the method comprising:

managing the memory mappings between a portion of system memory and the graphics processing unit, such that video data in the system memory is accessible to the graphics processing unit via the aperture;

allocating virtual memory and maintaining mappings between the allocated virtual memory and the physical memory of the local video memory, the physical memory of the system memory, and the physical memory of the system memory accessible via the aperture;

allocating and committing an application private virtual address range for a surface, the surface being directly accessible by the application via the main processing unit; and locking the committed application private virtual address range, whereby the operating system does not have permission to page out the surface from the system memory corresponding to the application private virtual address range.

22. The method as recited in claim 21, further comprising:
allocating and committing an application private virtual address range for a surface, the surface being directly accessible by the application via the main processing unit.

23. The method as recited in claim 21, further comprising:
allocating an address range in the graphics processing unit aperture for redirection to the surface; and causing the address range in the graphics processing unit aperture to be mapped to the committed application private virtual address range.

24. The method as recited in claim 23, further comprising:
unmapping and freeing the allocated graphics processing unit aperture address range; and unlocking the committed application private virtual address range, whereby the operating system has permission to page out the surface from the system memory corresponding to the committed application private virtual address range.

* * * * *